(12) United States Patent
Kim

(10) Patent No.: US 10,409,512 B2
(45) Date of Patent: Sep. 10, 2019

(54) METHOD OF OPERATING STORAGE CONTROLLER AND METHOD OF OPERATING DATA STORAGE DEVICE HAVING THE STORAGE CONTROLLER

(71) Applicant: SAMSUNG ELECTRONICS CO., LTD., Suwon-si (KR)

(72) Inventor: Dong Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 15/291,502

(22) Filed: Oct. 12, 2016

(65) Prior Publication Data
US 2017/0153836 A1 Jun. 1, 2017

(30) Foreign Application Priority Data
Nov. 26, 2015 (KR) ........................ 10-2015-0166440

(51) Int. Cl.
*G06F 3/06* (2006.01)
*G06F 13/42* (2006.01)

(52) U.S. Cl.
CPC .......... *G06F 3/0632* (2013.01); *G06F 3/0604* (2013.01); *G06F 3/0659* (2013.01); *G06F 3/0688* (2013.01); *G06F 13/4282* (2013.01); *G06F 2212/72* (2013.01); *Y02D 10/14* (2018.01); *Y02D 10/151* (2018.01)

(58) Field of Classification Search
CPC .... G06F 3/0632; G06F 3/0604; G06F 3/0659; G06F 3/0688; G06F 13/4282
See application file for complete search history.

(56) References Cited

U.S. PATENT DOCUMENTS

| | | | |
|---|---|---|---|
| 6,425,054 B1 * | 7/2002 | Nguyen | G06F 9/30036 711/117 |
| 6,693,846 B2 | 2/2004 | Fibranz | |
| 8,037,234 B2 | 10/2011 | Yu et al. | |
| 8,205,037 B2 | 6/2012 | Swing et al. | |
| 8,417,845 B2 | 4/2013 | Kim et al. | |
| 8,566,507 B2 | 10/2013 | Sprinkle et al. | |
| 8,566,508 B2 | 10/2013 | Borchers et al. | |
| 8,595,572 B2 | 11/2013 | Borchers et al. | |
| 8,700,881 B2 | 4/2014 | Lee | |
| 8,788,747 B2 | 7/2014 | Ahn et al. | |
| 2005/0036371 A1 * | 2/2005 | Kushida | G06F 11/1008 365/201 |
| 2008/0094877 A1 * | 4/2008 | Schneider | G11C 7/20 365/149 |
| 2014/0108705 A1 | 4/2014 | Gorobets | |
| 2014/0359264 A1 * | 12/2014 | Bhargava | G06F 9/4406 713/2 |

* cited by examiner

*Primary Examiner* — Eric Cardwell
(74) *Attorney, Agent, or Firm* — Sughrue Mion, PLLC

(57) ABSTRACT

A method of operating a storage controller which is included in a data storage device and initializes at least one main memory of the data storage device includes: transmitting, by a processor of the storage controller, a first indication signal for indicating initialization of the main memory of the data storage device to a first memory initialization device; generating, by a register of the first memory initialization device, a selection signal corresponding to the first indication signal, and outputting, by a memory set of the first memory initialization device, a first initialization signal to the main memory in response to the selection signal to initialize the main memory.

17 Claims, 33 Drawing Sheets

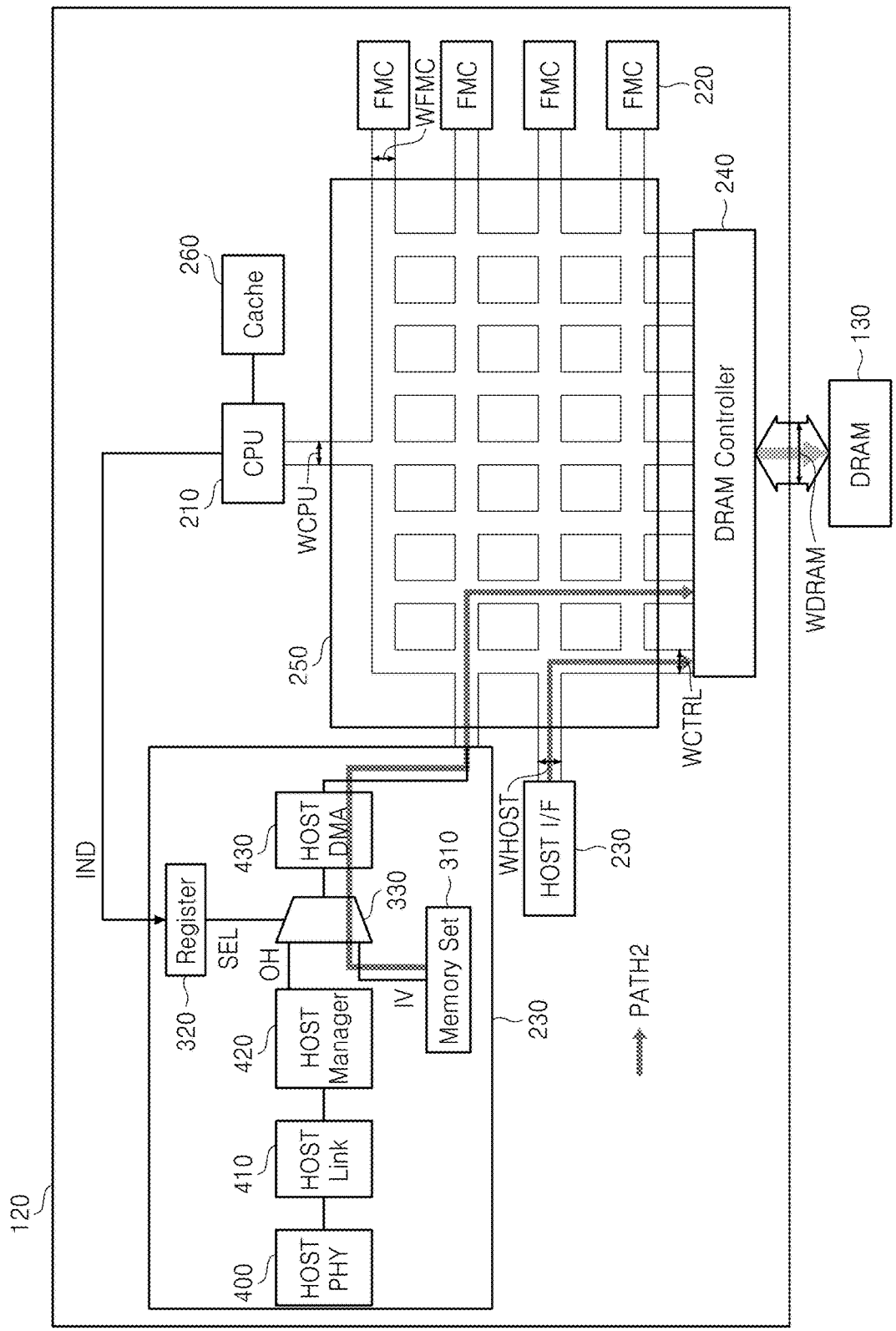

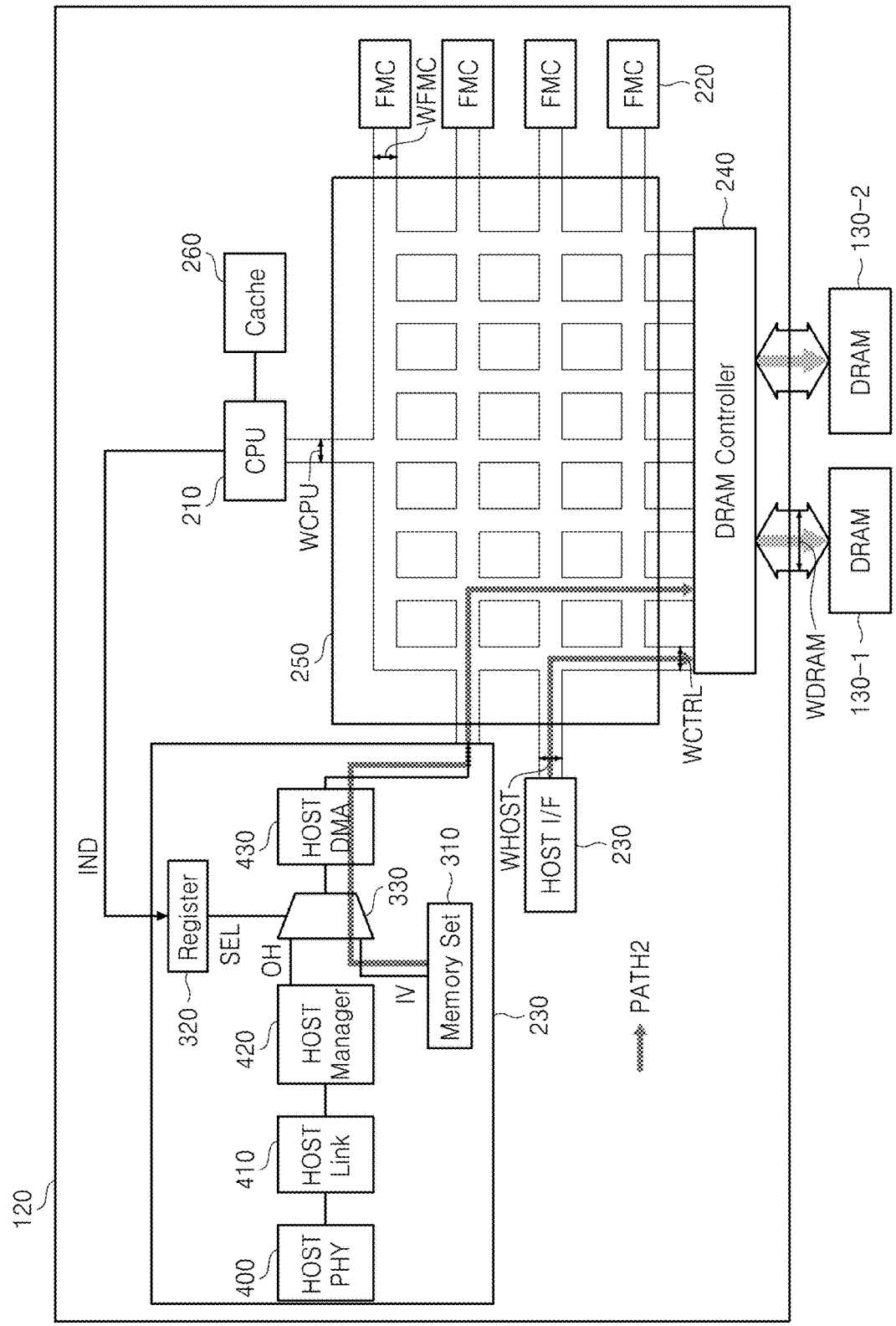

METHOD OF OPERATING STORAGE CONTROLLER AND METHOD OF OPERATING DATA STORAGE DEVICE HAVING THE STORAGE CONTROLLER

CROSS-REFERENCE TO THE RELATED APPLICATION

This application claims priority from Korean Patent Application No. 10-2015-0166440 filed on Nov. 26, 2015, the disclosure of which is incorporated herein in its entirety by reference.

BACKGROUND

1. Field

Methods and apparatuses consistent with exemplary embodiments of the inventive concept relate to operating a storage controller, and more particularly to initializing a main memory of a data storage device using a memory initialization device with a wider band width than a central processing unit (CPU) or a direct memory access (DMA).

2. Description of the Related Art

A solid state drive (SSD), as one of auxiliary memory devices, has advantages of having less operating noises, less power consumption, and faster speed than a hard disk drive (HDD). As a capacity of a NAND flash memory of the SSD is gradually increased, a capacity of a buffer memory such as a dynamic random access memory including meta information or a mapping table of the NAND flash memory is also constantly increased. An initializing operation is required to use a dynamic random access memory (DRAM), and, as a capacity of the DRAM is increased, time required to initialize the DRAM is also increased.

SUMMARY

Exemplary embodiments provide a storage controller and a method of operating the storage controller which reduce initialization time of a DRAM by initializing the DRAM included in an SSD using a memory initialization device with a wider bandwidth than a bandwidth of a CPU, and a method of operating a data storage device including the storage controller.

According to an exemplary embodiment there is provided a method of operating a storage controller which is included in a data storage device and initializes at least one main memory of the data storage device. The method may include: transmitting, by a processor, such as a CPU, of the storage controller, a first indication signal for indicating initialization of the main memory of the data storage device to a first memory initialization device; generating, by a register of the first memory initialization device, a selection signal corresponding to the first indication signal, and outputting, by a memory set of the first memory initialization device, a first initialization signal to the main memory in response to the selection signal to initialize the main memory.

The storage controller may include a bus matrix. The processor may communicate with the bus matrix in a first bandwidth, and the first memory initialization device may communicate with the bus matrix in a second bandwidth, while the second bandwidth may be wider than the first bandwidth.

The method of operating the storage controller may further include: transmitting, by the processor, the indication signal for indicating a normal operation of the first memory initialization device to the first memory initialization device; outputting, by the register, a selection signal corresponding to the indication signal for indicating the normal operation; and performing, by the first memory initialization device, the normal operation in response to the selection signal corresponding to the indication signal for indicating the normal operation.

The first memory initialization device may be one of a flash memory controller for controlling a NAND flash memory, a memory controller for controlling the main memory, and a host interface for communicating with a host. The main memory may be formed of a plurality of memories, which may be simultaneously initialized by the first initialization signal. The main memory may include a data region and a parity region, which may be simultaneously initialized by the first initialization signal.

The method may further include: transmitting, by the processor of the storage controller, a second indication signal for indicating the initialization of the main memory of the data storage device to a second memory initialization device; generating, by a register of the second memory initialization device, a selection signal corresponding to the second indication signal, and outputting, by a memory set of the second memory initialization device, a second initialization signal to the main memory in response to the selection signal corresponding to the second indication signal to initialize the main memory, wherein the first and second initialization signals simultaneously initialize the main memory. Here, the first memory initialization device may be one of a flash memory controller for controlling a NAND flash memory, a memory controller for controlling the main memory, and a host interface for communicating with a host, and the second memory initialization device may be another of the flash memory controller, the memory controller for controlling the main memory, and the host interface.

The method may further include: transmitting, by the processor of the storage controller, a third indication signal for indicating the initialization of the main memory of the data storage device to a third memory initialization device; generating, by a register of the third memory initialization device, a selection signal corresponding to the third indication signal, and outputting, by a memory set of the third memory initialization device, a third initialization signal to the main memory in response to the selection signal corresponding to the third indication signal to initialize the main memory, wherein the first, second and third initialization signals simultaneously initialize the main memory. Here, the first, second and third memory initialization devices may be, respectively, a flash memory controller for controlling a NAND flash memory, a memory controller for controlling the main memory, and a host interface for communicating with a host.

According to an exemplary embodiment, there may be provided a controller of a data storage device which may include: a processor configured to generate a first indication signal for indicating initialization of a main memory of the data storage device; and a first memory initialization device comprising a register and a memory set and configured to receive the first indication signal, wherein the register is configured to generate a selection signal corresponding to the first indication signal, and the memory set is configured to output a first initialization signal to the main memory in response to the selection signal to initialize the main memory. Here, the first memory initialization device may be one of a flash memory controller for controlling a NAND flash memory, a memory controller for controlling the main memory, and a host interface for communicating with a host.

The processor may be further configured to generate a second indication signal for indicating the initialization of the main memory of the data storage device, wherein the controller further includes a second memory initialization device including a register and a memory set and configured to receive the second indication signal from the processor, wherein the register of the second memory initialization device is configured to generate a selection signal corresponding to the second indication signal, and the memory set of the second memory initialization device is configured to output a second initialization signal to the main memory in response to the selection signal corresponding to the second indication signal to initialize the main memory, and wherein the first and second signals simultaneously initialize the main memory.

The first memory initialization device may be one of a flash memory controller for controlling a NAND flash memory, a memory controller for controlling the main memory, and a host interface for communicating with a host. The second memory initialization device may be another of the flash memory controller, the memory controller for controlling the main memory, and the host interface.

The processor may be further configured to generate a third indication signal for indicating the initialization of the main memory of the data storage device, wherein the controller further includes a third memory initialization device including a register and a memory set and configured to receive the third indication signal from the processor, wherein the register of the third memory initialization device is configured to generate a selection signal corresponding to the third indication signal, and the memory set of the third memory initialization device is configured to output a third initialization signal to the main memory in response to the selection signal corresponding to the third indication signal to initialize the main memory, and wherein the first, second and third initialization signals simultaneously initialize the main memory.

The main memory may include a first memory and a second memory, wherein at least one of the first and second initialization signals initializes the first memory, and, at the same time, the third initialization signal initializes the second memory.

BRIEF DESCRIPTION OF THE DRAWINGS

These and/or other aspects and advantages of the inventive concept will become apparent and more readily appreciated from the following description of the exemplary embodiments, taken in conjunction with the accompanying drawings of which:

FIG. 5A is a block diagram of the SSD controller shown in FIG. 2 when one DRAM is initialized by a host interface, according to an exemplary embodiment;

FIG. 5B is a block diagram of the SSD controller shown in FIG. 2 when two or more DRAMs are initialized by the host interface, according to an exemplary embodiment;

DETAILED DESCRIPTION OF THE EXEMPLARY EMBODIMENTS

Figure 1:
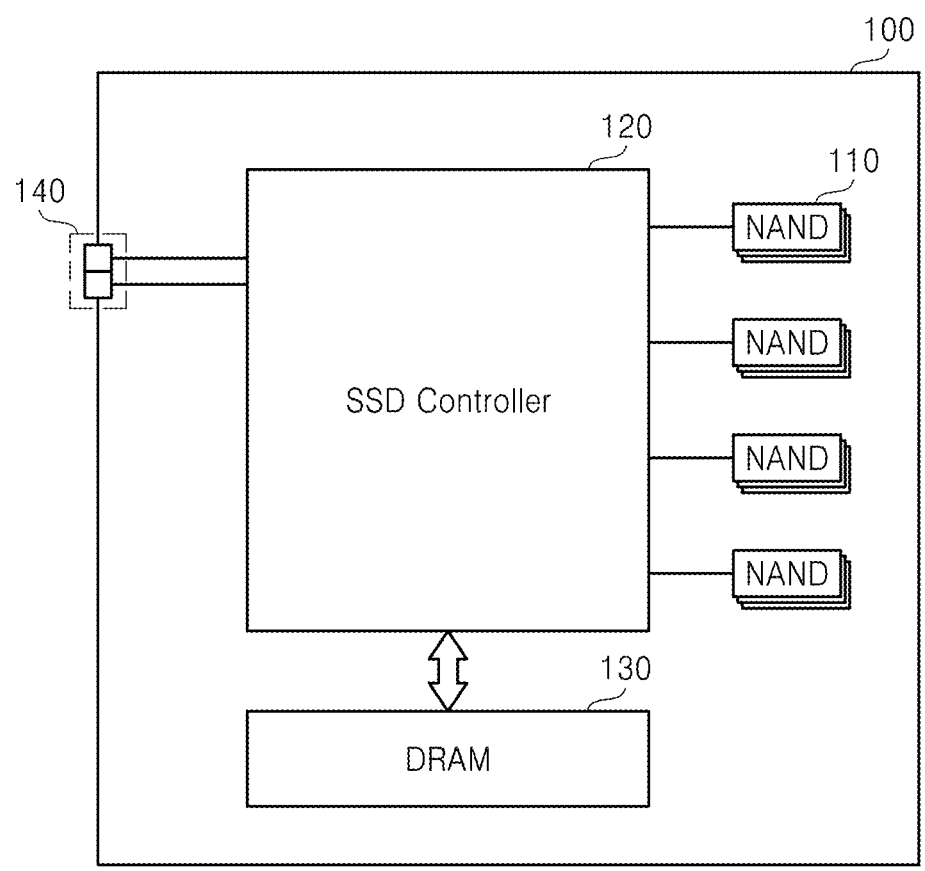
FIG. 1 is a block diagram of an SSD, according to an embodiment.

The inventive concepts now will be described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "simultaneously" herein may refer to not only physically the same time but also performance of operations to be described thereabout in parallel not in serial.

The term "normal operation" herein may refer to an operation performed by a device when the device does not have a multiplexer, a register, and a memory set. That is, when the device is a flash memory controller, a normal operation of the flash memory controller may refer to an operation of outputting data transmitted from NAND flash memories through a NAND PHY, an error correction code (ECC) circuit, and a randomizer, when the device is a host interface, a normal operation of the host interface may refer to an operation of outputting data transmitted from a host through a host PHY, a host link, a host manager, and a host direct memory access (DMA), and when the device is a DRAM controller, a normal operation of the DRAM controller may refer to an operation of outputting data transmitted from a DRAM controller to a DRAM through a DRAM PHY.

On the other hand, the term "initialization operation" herein, in contrast with the "normal operation," may refer to an operation of transmitting data stored in a memory set to a DRAM through a multiplexer by a control of a CPU.

FIG. 1 is a block diagram of an SSD, according to an exemplary embodiment. Referring to FIG. 1, a solid state drive (SSD) 100 may include a plurality of NAND flash memories 110, an SSD controller 120, a dynamic random access memory (DRAM) 130, and a connector 140.

The NAND flash memories 110 may store data transmitted from a host. Four NAND flash memories 110 are shown in FIG. 1 for convenience of description; however, it is not limited thereto. That is, the number of the NAND flash memories 110 included in the SSD 100 may be changed according to a system design.

The NAND flash memories 110 may include a three-dimensional memory cell array. The three-dimensional memory cell array is monolithically formed in one or more physical levels of an array of memory cells having an active region disposed on or above a silicon substrate, and may include a circuit related to operations of the memory cells. The circuit may be formed in the substrate, or on or above the substrate. A term of "monolithic" means that layers of each level of an array are directly deposited on layers of each underlying level of the array.

The three-dimensional memory cell array may include a vertical NAND string vertically oriented so that at least one memory cell is positioned on or above another memory cell. The at least one memory cell may include a charge trap layer.

The SSD controller 120 may generally control an operation of the SSD 100. The SSD controller 120 may read data from the NAND flash memories 110 and transmit the data to the outside through the connector 140, or write data transmitted from the outside to the NAND flash memories 110 through the DRAM 130.

The DRAM 130 may be used as a cache (or buffer) of the SSD 100. The DRAM 130 may temporarily store data to be stored in the NAND flash memories 110 or data loaded from the NAND flash memories 110. The DRAM 130 may be referred to as a main memory of the SSD 100 or a computing device including the SSD 100.

The SSD 100 may be connected to a host through the connector 140. The connector 140 may include a pad(s). According to exemplary embodiments, the number of the pad(s) may be equal to the number of host interfaces included in the SSD controller 120.

Figure 2:
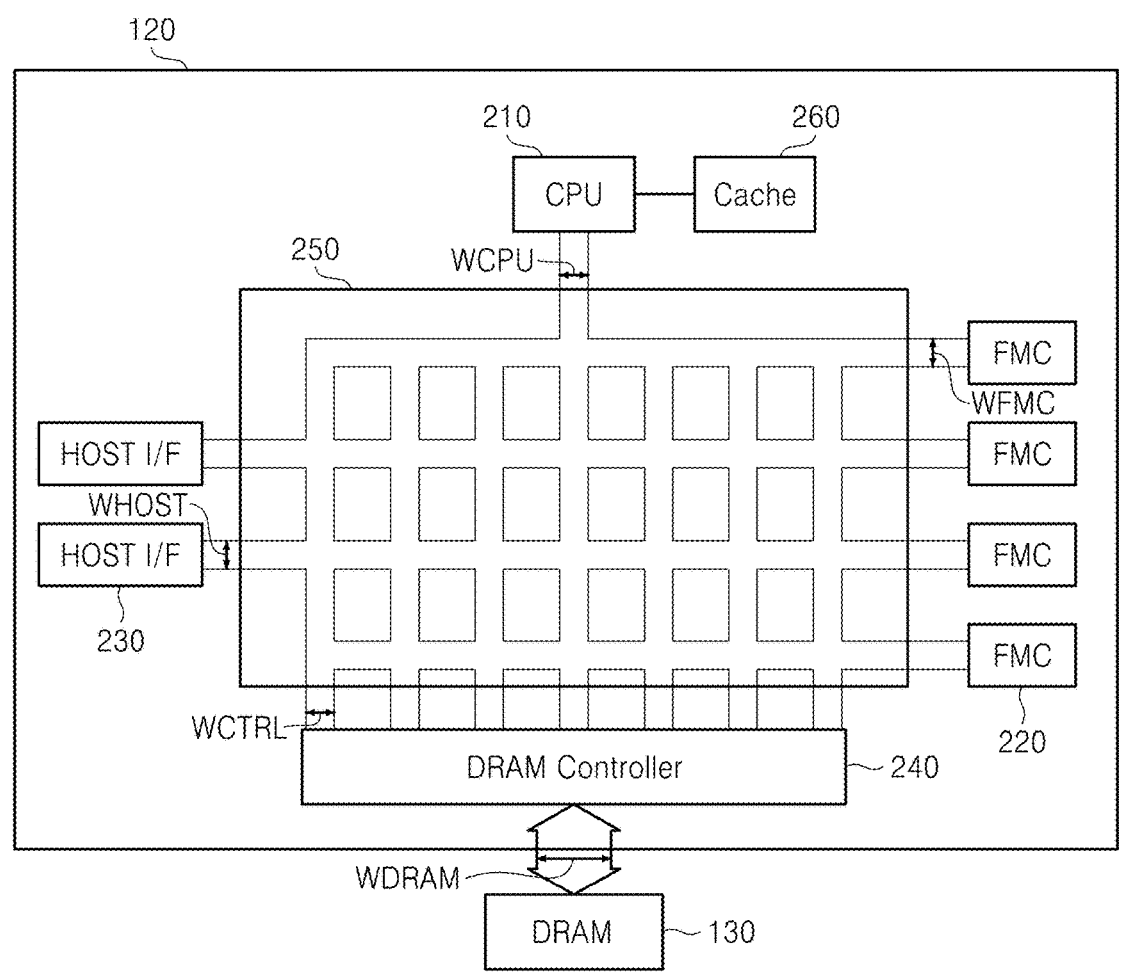
FIG. 2 is a block diagram of an SSD controller and a DRAM shown in FIG. 1, according to an exemplary embodiment.

FIG. 2 is a block diagram of the SSD controller 120 and the DRAM 130 shown in FIG. 1, according to an exemplary embodiment. Referring to FIGS. 1 and 2, the SSD controller 120 may include a processor such as a central processing unit (CPU) 210, a flash memory controller (FMC) 220, a host interface 230, a DRAM controller 240, a bus matrix 250, and a cache 260. The CPU 210 may generally control an operation of the SSD controller 120.

The FMC 220 may control at least one of the NAND flash memories 110 according to a control of the CPU 210. Data stored in the NAND flash memory 110 may be read or data may be written to the NAND flash memory 110 by a control of the FMC 220.

For convenience of description, four FMCs 220 are shown in FIG. 2; however, it is not limited thereto. That is, the number of the FMCs 220 may be changed according to a system design. The number of the FMCs 220 may be less than or equal to the number of the NAND flash memories 110.

The host interface 230 may change a format of data transmitted to a host to be used by the host, and transmit data having a changed format to the host through the connector 140. Moreover, the host interface 230 may receive data transmitted from the host, change a format of received data, and transmit data having a changed format to the NAND flash memory 110. According to an exemplary embodiment, the host interface 230 may include a transceiver for transmitting and receiving data.

For convenience of description, two host interfaces 230 are shown in FIG. 2; however, it is not limited thereto. That is, the number of the host interfaces 230 may be changed according to a system design. The number of the host interfaces 230 may be equal to the number of pads included in the connector 140.

The host interface 230 may be embodied by a serial ATA (SATA) interface, a SATA express (SATAe) interface, a serial attached SCSI (SAS) interface, a peripheral component interconnect express (PCIe) interface, or a non-volatile memory express (NVMe) interface; however, it is not limited thereto.

The DRAM controller 240 may write data to the DRAM 130 or read data from the DRAM 130 according to a control of the CPU 210. Data processed by the DRAM controller 240 may be transmitted to the FMC 220 or the host interface 230.

The CPU 210, the FMC 220, the host interface 230, and the DRAM controller 240 may communicate with one another through the bus matrix 250. The bus matrix 250 may include a plurality of buses. The bus matrix 250 may be embodied in an advanced microcontroller bus architecture (AMBA), an advanced high-performance bus (AHB), an advanced peripheral bus (APB), an advanced eXtensible interface (AXI), an advanced system bus (ASB), or a combination of these; however, it is not limited thereto.

The cache 260 may store data necessary for an operation of the CPU 210, and transmit the data to the CPU 210 according to a request of the CPU 210. According to exemplary embodiments, the cache 260 may be embodied by a static random access memory (SRAM).

A bandwidth WCPU of a bus connecting the CPU 210 and the bus matrix 250 may be narrower than each of a bandwidth WHOST of a bus connecting the host interface 230 and the bus matrix 250, a bandwidth WFMC of a bus connecting the FMC 220 and the bus matrix 250, and a bandwidth WCTRL of a bus connecting the DRAM controller 240 and the bus matrix 250.

A bandwidth WDRAM of a bus connecting the DRAM controller 240 and the DRAM 130 may be equal to each of a sum of the bandwidths WHOST of buses connecting the host interfaces 230 and the bus matrix 250, a sum of the bandwidths WFMC of buses connecting the FMCs 220 and the bus matrix 250, and the bandwidth WCPU of the bus connecting the CPU 210 and the bus matrix 250.

The bandwidth WDRAM of the bus connecting the DRAM controller 240 and the DRAM 130 may be equal to a sum of bandwidths WCTRL of buses connecting the DRAM controller 240 and the bus matrix 250.

Figure 3A:
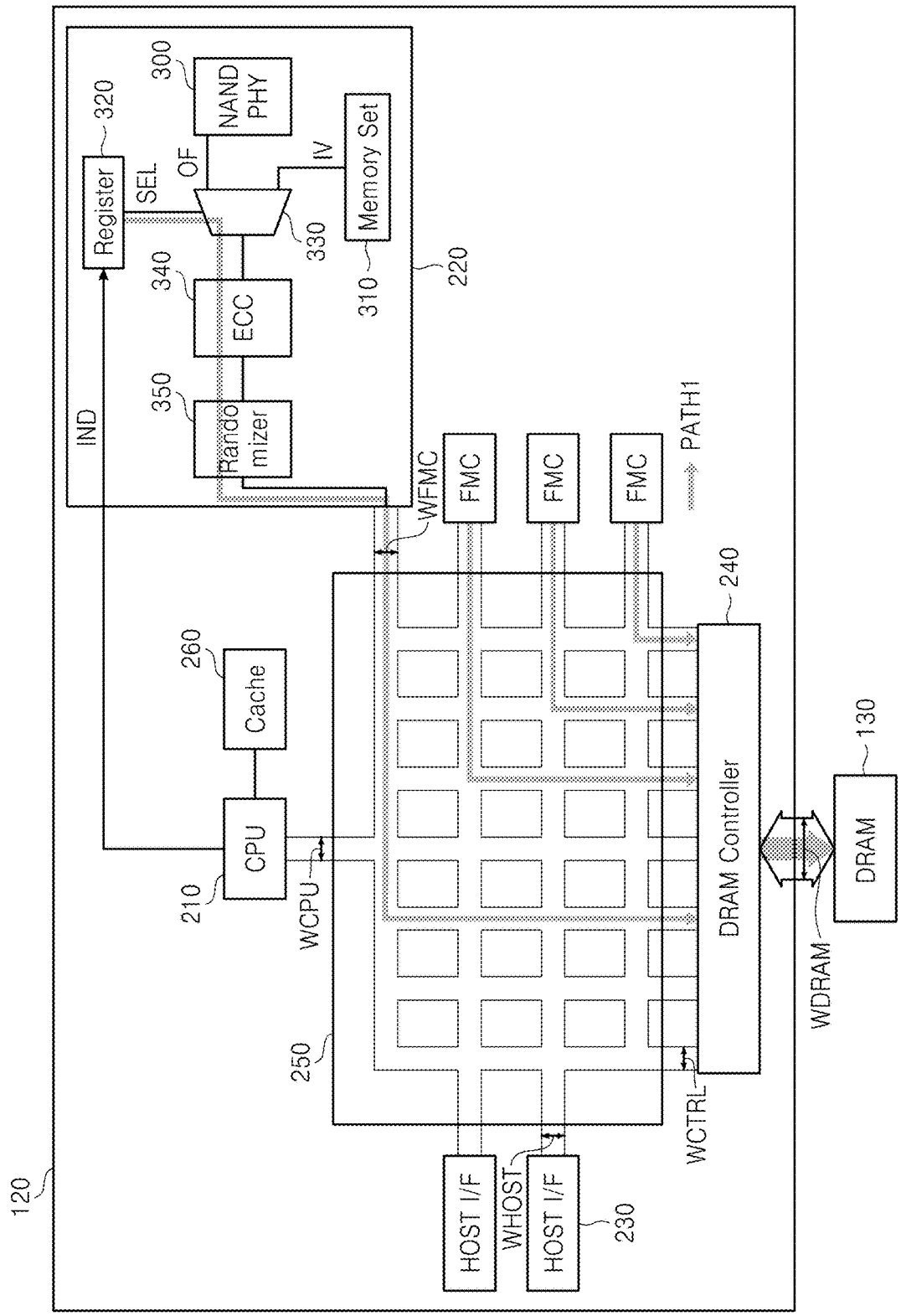
FIG. 3A is a block diagram of the SSD controller shown in FIG. 2 when one DRAM is initialized by a flash memory controller (FMC), according to an exemplary embodiment.
Figure 3B:
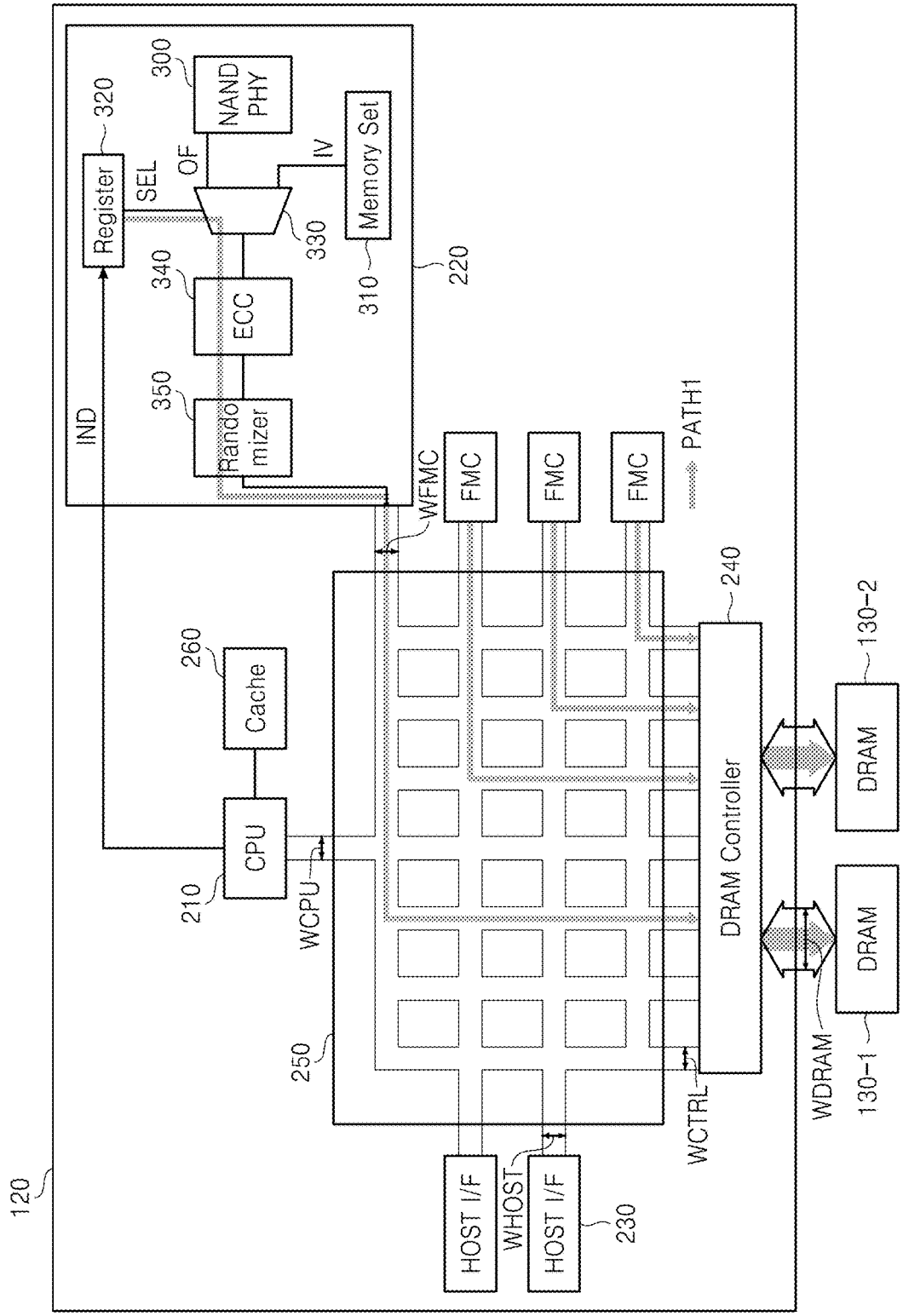
FIG. 3B is a block diagram of the SSD controller shown in FIG. 2 when two or more DRAMs are initialized by the FMC, according to an exemplary embodiment.
Figure 3C:
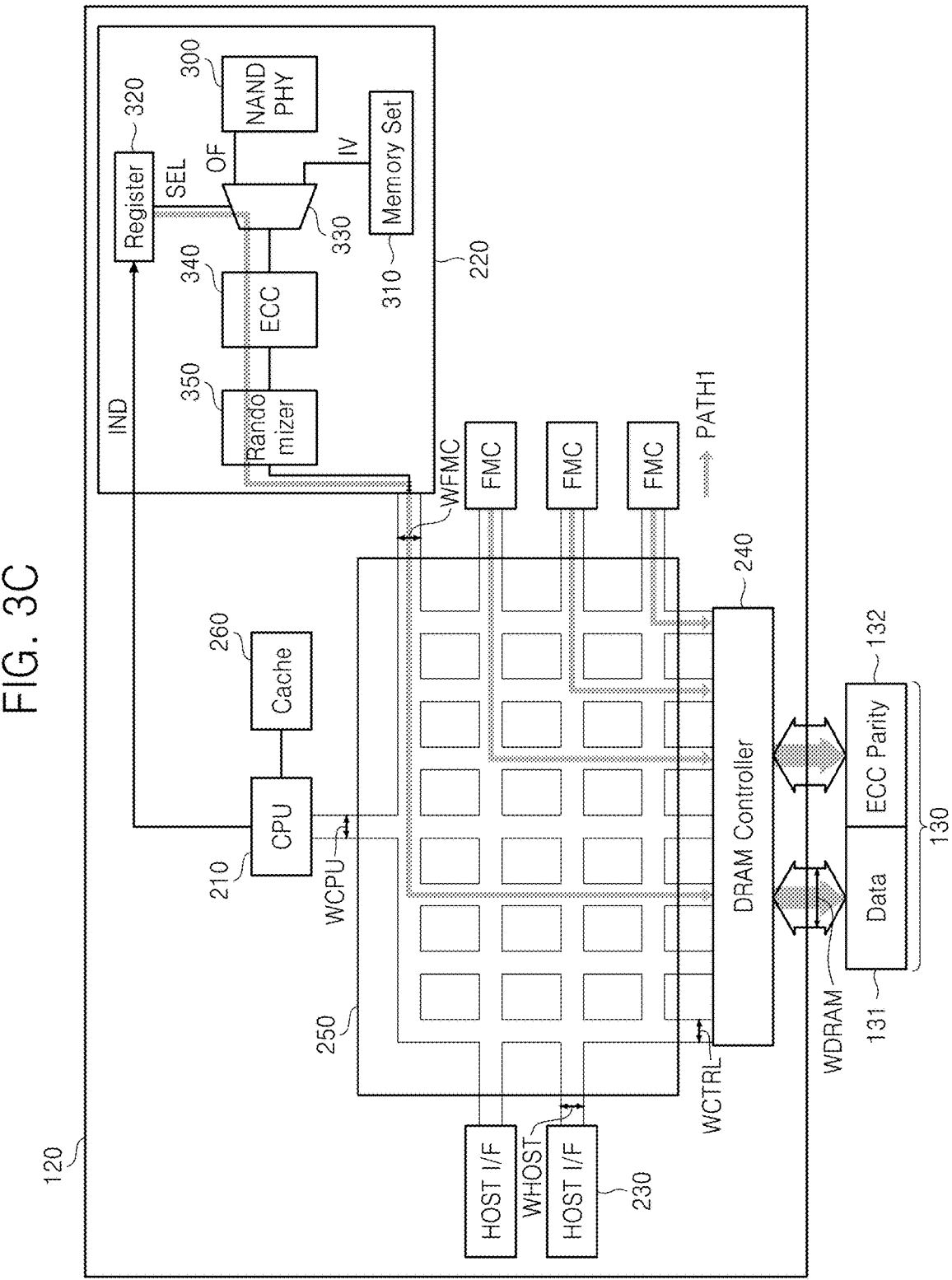
FIG. 3C is a block diagram of the SSD controller shown in FIG. 2 when a data region and a parity region included in the DRAM are initialized by the FMC, according to an exemplary embodiment.
Figure 4:
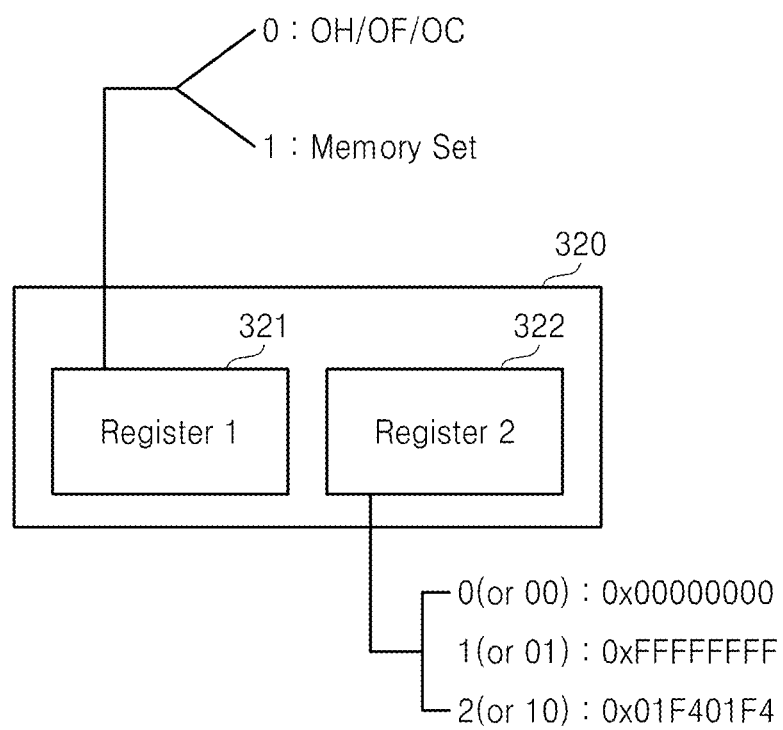
FIG. 4 is a block diagram of a register shown in FIGS. 3A, 3B, and 3C, according to an exemplary embodiment.

FIG. 3A is a block diagram of the SSD controller 120 shown in FIG. 2 when one DRAM is initialized by an FMC, according to an exemplary embodiment, and FIG. 3B is a block diagram of the SSD controller 120 shown in FIG. 2 when two or more DRAMs are initialized by an FMC, according to an exemplary embodiment. FIG. 3C is a block diagram of the SSD controller 120 shown in FIG. 2 when a data region and a parity region included in a DRAM are initialized by the FMC, according to an exemplary embodiment, and FIG. 4 is a block diagram of a register shown in FIGS. 3A, 3B, and 3C.

Referring to FIGS. 1 to 3C, the FMC 220 may include a NAND PHY 300, a memory set 310, a register 320, a multiplexer 330, an error correction code (ECC) circuit 340, and a randomizer 350.

The CPU 210 may transmit an indication signal IND for controlling whether to initialize the DRAM 130 to the register 320. The indication signal IND may include information on a signal and/or data to be output by the multiplexer 330.

The NAND PHY 300 may change a format of data to be transmitted to the NAND flash memories 110 to be suitable for the NAND flash memories 110, and also change a format of data received from the NAND flash memories 110 so that the data may be used by the SSD controller 120.

The memory set 310 may output data corresponding to a selection signal SEL output from a register to the multiplexer 330. The memory set 310 may store initialization value sets for the DRAM 130. The register 320 may output a selection signal SEL to the multiplexer 330 in response to the indication signal IND output from the CPU 210. The register 320 may be made of one register or made of a plurality of registers according to a system design.

Referring to FIG. 4, according to an exemplary embodiment, the register 320 may include a first register 321 and a second register 322. The first register 321 may store information corresponding to a signal OF from the NAND PHY 300 and information corresponding to a signal IV from the memory set 310, that is, an initialization signal IV as described below. The second register 322 may store information corresponding to an initialization data set transmitted to the DRAM 130.

For example, it is assumed that a number of "0" in the first register 321 represents a normal operation, a number of "1" in the first register 321 represents an initialization operation, a number of "0" (or "00") in the second register 322 represents data to be output from the memory set 310, which is 0x00000000, a number of "1" (or "01") represents data to be output from the memory set 310, which is 0XFFFFFFFF, and a number of "2" (or 10) represents data to be output from the memory set 310, which is 0X01F401F4.

Accordingly, when the CPU 210 instructs a normal operation of the FMC 220, the register 320 outputs a selection signal SEL corresponding to the number of "0" stored in the first register 321, and when the CPU 210 instructs the DRAM 130 to be initialized to 0XFFFFFFFF, the register 320 may output from the register 320 a selection signal SEL corresponding to the number of "1" mapped to an initialization operation from the first register 321 and the number of "1" (or 01) mapped to 0XFFFFFFFF in the second register 322.

The multiplexer 330 may output one of the two signals OF and IV according to the selection signal SEL output from the register 320.

For example, referring to FIG. 4, when a selection signal SEL input to the multiplexer 330 corresponds to the number of "0" of the first register 321, the multiplexer 330 may output the signal OF from the NAND PHY 300 to the ECC circuit 340, and when a selection signal SEL input to the multiplexer 330 corresponds to the number of "1" of the first register and the number of "1" (or the number of "01") of the second register 322, the multiplexer 330 may output the signal IV from the memory set 310 to the ECC circuit 340.

The ECC circuit 340 may correct an error included in data to be stored in the NAND flash memories 110 and/or data output from the NAND flash memories 110. The randomizer 350 may make a uniform probability of the number of "0" or "1" configuring data transmitted to the NAND flash memories 110.

Referring to FIG. 3A, when the CPU 210 transmits an indication signal IND for indicating an initialization operation to the register 320, the register 320 may transmit a selection signal SEL corresponding to the indication signal IND to the multiplexer 330.

The memory set 310 may output an initialization signal IV corresponding to the selection signal SEL to the multiplexer 330, and the initialization signal IV may be transmitted to the DRAM controller 240 through the ECC circuit 340 and the randomizer 350.

For convenience of description, a block diagram of one FMC 220 is shown in FIG. 3A; however, the other three FMCs 220 may have the same internal configuration as the FMC 220 as shown in FIG. 3A. Accordingly, each of the four FMCs 220 may transmit an initialization signal IV to the DRAM controller 240 through a corresponding first path PATH1.

The DRAM controller 240 may transmit the initialization signal IV transmitted through the first path PATH1 to the DRAM 130, and the DRAM 130 may be initialized using data included in the initialization signal IV.

Referring to FIG. 3B, the SSD 100 may include DRAMs 130-1 and 130-2. Two DRAMs 130-1 and 130-2 are shown in FIG. 3B; however, the number of DRAMs may be changed according to a system design. A sum of bandwidths WDRAM of buses connecting the DRAM controller 240 and the DRAMs 130-1 and 130-2 may be equal to a sum of the bandwidths WCTRL of buses connecting the DRAM controller 240 and the bus matrix 250.

The DRAM controller 240 may receive the initialization signal IV through the first path PATH1 in the same manner as described with respect to FIG. 3A. The DRAM controller 240 may simultaneously transmit the initialization signal IV to the DRAMs 130-1 and 130-2. The DRAMs 130-1 and 130-2 may be simultaneously initialized using data included in the initialization signal IV.

Referring to FIG. 3C, the DRAM 130 may include a data region 131 and a parity region 132. The data region 131 may store meta information and a mapping table of the NAND flash memories 110. The parity region 132 may store error detection data for detecting an error of data stored in the data region 131.

A sum of a bandwidth WDRAM of a bus connecting the DRAM controller 240 and the data region 131 and a bandwidth WDRAM of a bus connecting the DRAM controller 240 and the parity region 132 may be equal to a sum of the bandwidths WCTRL of buses connecting the DRAM controller 240 and the bus matrix 250.

The DRAM controller 240 may receive the initialization signal IV through the first path PATH1 in the same manner as described with respect to FIG. 3A. The DRAM controller 240 may simultaneously transmit the initialization signal IV to the data region 131 and the parity region 132. The data region 131 and the parity region 132 may be simultaneously initialized using data included in the initialization signal IV.

Figure 5C:
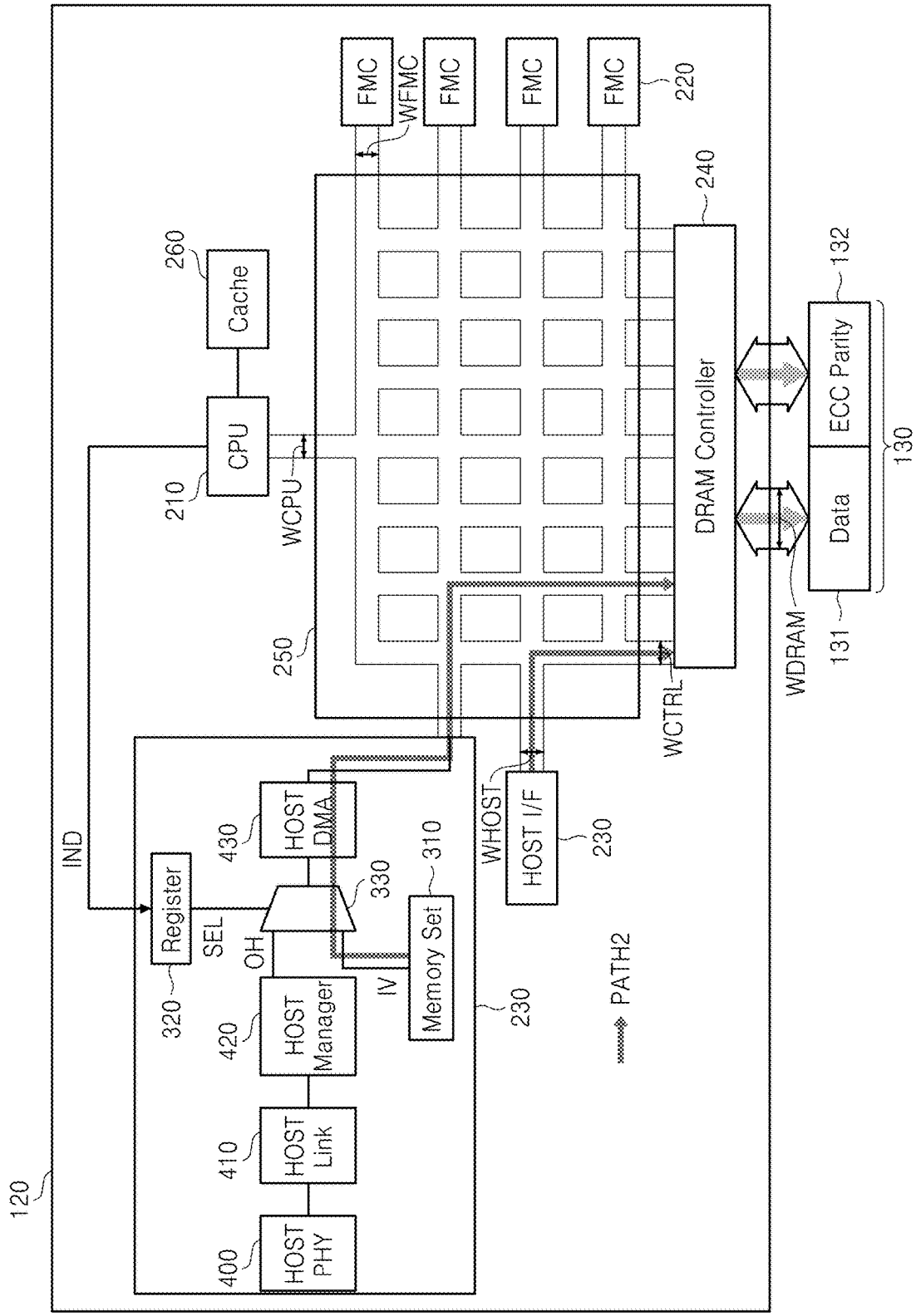
FIG. 5C is a block diagram of the SSD controller shown in FIG. 2 when the data region and the parity region included in the DRAM are initialized by the host interface, according to an exemplary embodiment.

FIG. 5A is a block diagram of the SSD controller 120 shown in FIG. 2 when one DRAM is initialized by a host interface, according to an exemplary embodiment, FIG. 5B is a block diagram of the SSD controller 120 shown in FIG. 2 when two or more DRAMs are initialized by a host interface, according to an exemplary embodiment, and FIG. 5C is a block diagram of the SSD controller 120 shown in FIG. 2 when a data region and a parity region included in a DRAM are initialized by a host interface, according to an exemplary embodiment.

Referring to FIGS. 5A, 5B, and 5C, the host interface 230 may include a host PHY 400, a host link 410, a host manager 420, a host direct memory access (DMA) 430, the memory set 310, a register 320, and a multiplexer 330.

The memory set 310, the register 320, and the multiplexer 330 included in the host interface 230 may be the same as those shown in FIGS. 3A, 3B, and 3C, respectively, in structure and function.

The host PHY 400 may change an analog signal transmitted from a host to a digital signal, and change a digital signal transmitted to the host to an analog signal. The host link 410 may define a start and an end of data received from the host PHY 400 and may generate a frame of the data. The host manager 420 may change a format of data transmitted to a host to be used by the host, and may change a format of data received from the host so that the data received from the host may be used by the SSD 100. The host DMA 430 may transmit an output of the multiplexer 330 directly to the DRAM 130 without passing through the CPU 210, or directly transmit the output of the multiplexer 330 to the NAND flash memories 110 through the DRAM 130.

Referring to FIG. 5A, when the CPU 210 transmits an indication signal IND for indicating an initialization operation to the register 320, the register 320 may transmit a selection signal SEL corresponding to the indication signal IND to the multiplexer 330. The memory set 310 may output an initialization signal IV corresponding to the selection signal SEL to the multiplexer 330, and the initialization signal IV may be transmitted to the DRAM controller 240 through the host DMA 430.

For convenience of description, a block diagram for one host interface 230 is shown in FIG. 5A; however, the other host interfaces 230 may have the same internal configuration as the host interface 230 as shown in FIG. 5A. Accordingly, each of two host interfaces 230 may transmit an initialization signal IV to the DRAM controller 240 through a corresponding second path PATH2.

The DRAM controller 240 may transmit the initialization signal IV transmitted through the second path PATH2 to the DRAM 130, and the DRAM 130 may be initialized using data included in the initialization signal IV.

Referring to FIG. 5B, the SSD 100 may include DRAMs 130-1 and 130-2. Two DRAMs 130-1 and 130-2 are shown in FIG. 5B; however, the number of DRAMs may be changed according to a system design. A sum of bandwidths WDRAM of buses connecting the DRAM controller 240 and the DRAMs 130-1 and 130-2 may be equal to a sum of the bandwidths WCTRL of buses connecting the DRAM controller 240 and the bus matrix 250.

The DRAM controller 240 may receive the initialization signal IV through the second path PATH2 in the same manner as described with respect to FIG. 5A. The DRAM controller 240 may simultaneously transmit the initialization signal IV to the DRAMs 130-1 and 130-2. The DRAMs 130-1 and 130-2 may be simultaneously initialized using data included in the initialization signal IV.

Referring to FIG. 5C, the DRAM 130 may include a data region 131 and a parity region 132 which may be the same as the data region 131 and the parity region 132, respectively, as shown in FIG. 3C in structure and function.

A sum of a bandwidth WDRAM of buses connecting the DRAM controller 240 and the data region 131 and a bandwidth WDRAM of a bus connecting the DRAM controller 240 and the parity region 132 may be equal to a sum of the bandwidths WCTRL of buses connecting the DRAM controller 240 and the bus matrix 250.

The DRAM controller 240 may receive an initialization signal IV through the second path PATH2 in the same manner as described with respect to FIGS. 5A and 5B. The DRAM controller 240 may simultaneously transmit the initialization signal IV to the data region 131 and the parity region 132. The data region 131 and the parity region 132 may be simultaneously initialized using data included in the initialization signal IV.

Figure 6A:
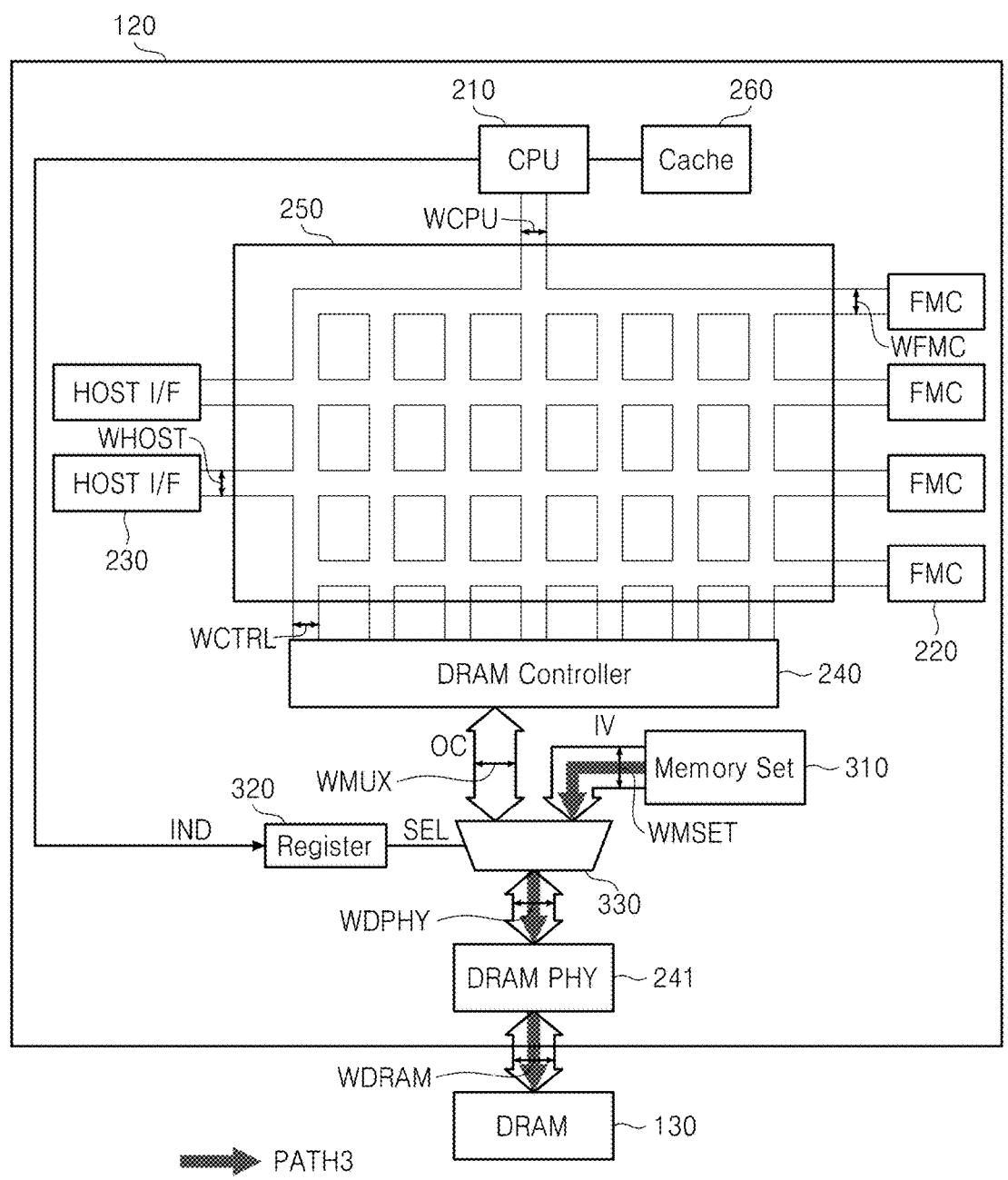
FIG. 6A is a block diagram of the SSD controller shown in FIG. 2 when one DRAM is initialized by a DRAM controller, according to an exemplary embodiment.

FIG. 6A is a block diagram of the SSD controller 120 shown in FIG. 2 when one DRAM is initialized by a DRAM controller, according to an exemplary embodiment. Referring to FIG. 6A, the SSD controller 120 may include a memory set 310, a register 320, a multiplexer 330, and a DRAM PHY 241. The DRAM PHY 241 may change a format of data transmitted to the DRAM 130 to be suitable for the DRAM 130, and may change a format of received data so that the data received from the DRAM 130 are used by the DRAM controller 240.

The memory set 310, the register 320, and the multiplexer 330 shown in FIG. 6A may be the same as those set shown in FIGS. 3A, 3B, and 3C, respectively, in structure and function.

According to an exemplary embodiment, the memory set 310, the register 320, the multiplexer 330, and the DRAM PHY 241 shown in FIG. 6A may be included in the DRAM controller 240. In this case, a connection type between the memory set 310, the register 320, the multiplexer 330, and the DRAM PHY 241 may be the same as in FIG. 6A. A bandwidth WMUX of a bus connecting the DRAM controller 240 and the multiplexer 330, a bandwidth of a bus WMSET connecting the memory set 310 and the multiplexer 330, a bandwidth WDPHY of a bus connecting the multiplexer 330 and the DRAM PHY 241, and a bandwidth WDRAM of a bus connecting the DRAM PHY 241 and the DRAM 130 may be all the same.

When the CPU 210 transmits an indication signal IND for indicating an initialization operation to the register 320, the register 320 may transmit a selection signal SEL corresponding to the indication signal IND to the multiplexer 330. The memory set 310 may output an initialization signal IV corresponding to the selection signal SEL to the DRAM PHY 241 through a third path PATH3. The DRAM PHY 241 may transmit the initialization signal IV to the DRAM 130. The DRAM 130 may be initialized using data included in the initialization signal IV.

Figure 6B:
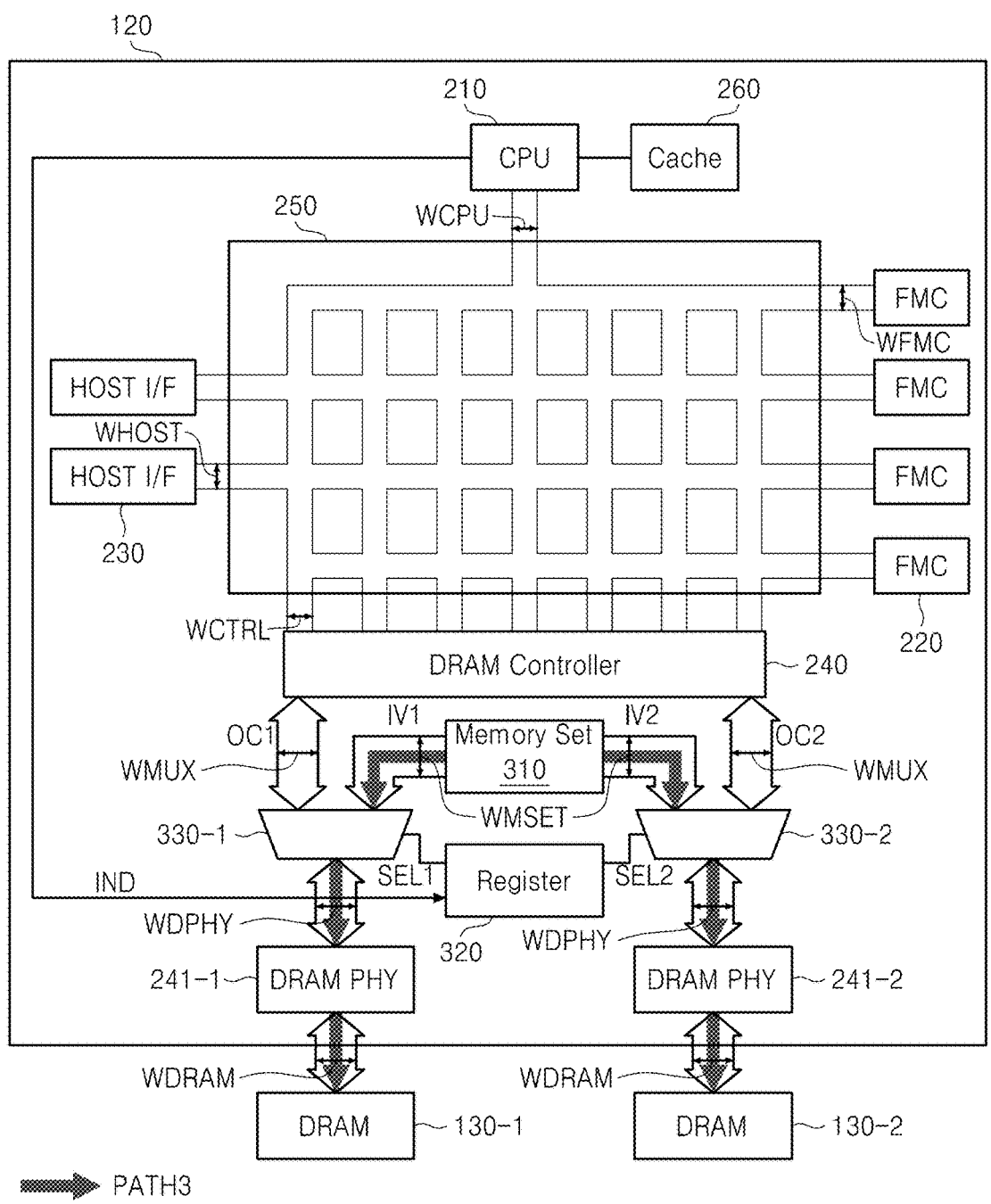
FIG. 6B is a block diagram of the SSD controller shown in FIG. 2 when two or more DRAMs are initialized by the DRAM controller, according to an exemplary embodiment.
Figure 6C:
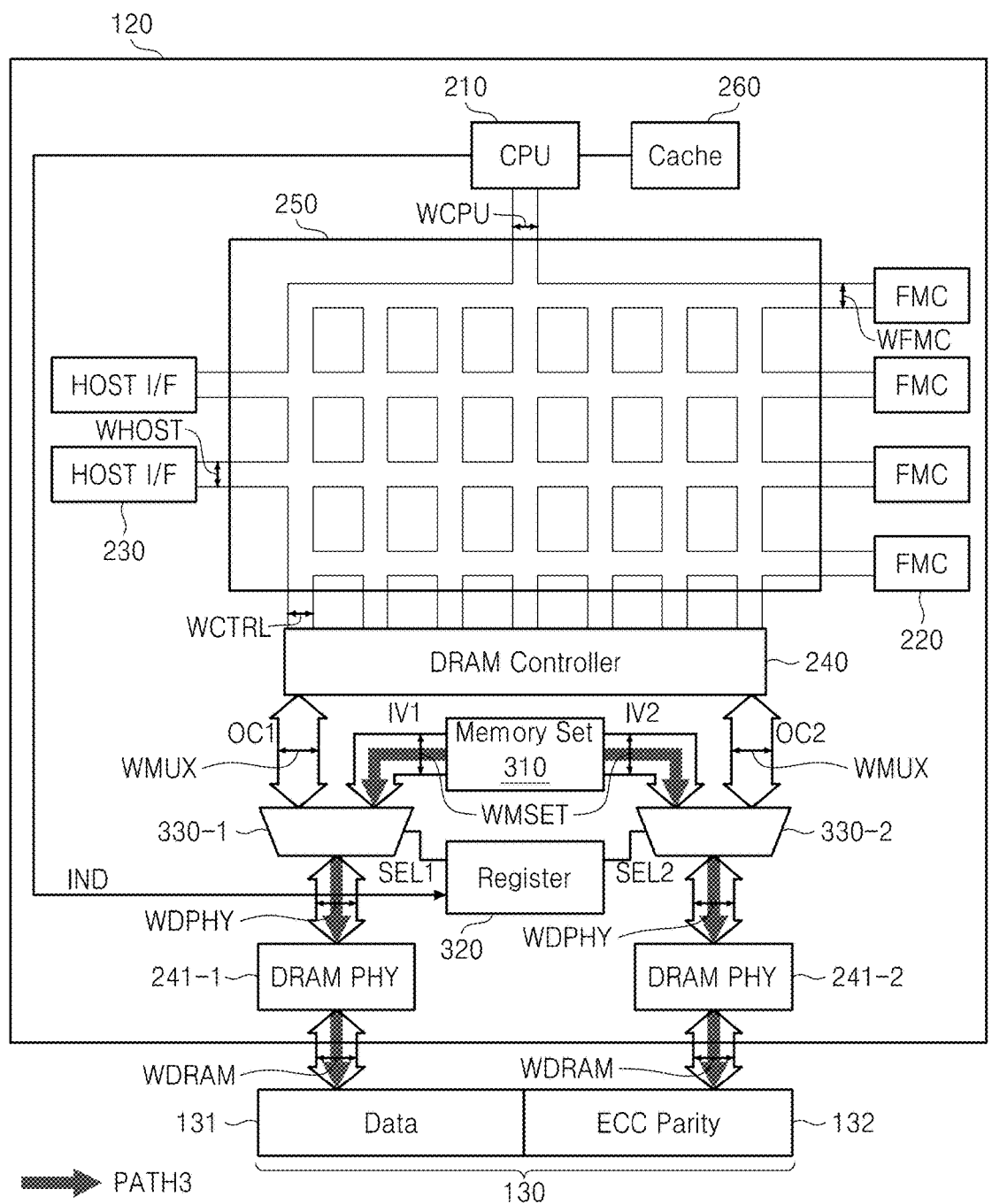
FIG. 6C is a block diagram of the SSD controller shown in FIG. 2 when the data region and the parity region included in the DRAM are initialized by the DRAM controller, according to an exemplary embodiment.

FIG. 6B is a block diagram of the SSD controller 120 shown in FIG. 2 when two or more DRAMs are initialized by a DRAM controller according to an exemplary embodiment, and FIG. 6C is a block diagram of the SSD controller 120 shown in FIG. 2 when a data region and a parity region included in a DRAM are initialized by a DRAM controller according to an exemplary embodiment.

Referring to FIGS. 6B and 6C, the SSD 100 may include DRAM PHYs 241-1 and 241-2, and multiplexers 330-1 and 330-2.

A sum of a bandwidth WMUX of a bus connecting the multiplexer 330-1 and the DRAM controller 240 and a bandwidth WMUX of a bus connecting the multiplexer 330-2 and the DRAM controller 240 may be equal to a sum of a bandwidth WMSET of a bus connecting the multiplexer 330-1 and the memory set 310 and a bandwidth WMSET of a bus connecting the multiplexer 330-2 and the memory set 310, a sum of a bandwidth WDPHY of a bus connecting the multiplexer 330-1 and the DRAM PHY 241-1 and a bandwidth WDPHY of a bus connecting the multiplexer 330-2 and the DRAM PHY 241-2, and a sum of a bandwidth WDRAM of a bus connecting the DRAM PHY 241-1 and the data region 131 and a bandwidth WDRAM of a bus connecting the DRAM PHY 241-2 and the parity region 132.

The sum of the bandwidth WMUX of the bus connecting the multiplexer 330-1 and the DRAM controller 240 and the bandwidth WMUX of the bus connecting the multiplexer 330-2 and the DRAM controller 240 may be equal to the sum of the bandwidths WCTRL of buses connecting the DRAM controller 240 and the bus matrix 250.

Initialization signals IV1 and IV2 output from the memory set 310 may include the same or different information according to a system design. Selection signals SEL1 and SEL2 output from the register 320 may include the same or different information according to a system design.

Referring to FIG. 6B, the SSD 100 may include the DRAMs 130-1 and 130-2. Only the two DRAMs 130-1 and 130-2 are shown in FIG. 6B; however, the number of DRAMs may be changed according to a system design. The number of the DRAMs 130-1 and 130-2, the number of the DRAM PHYs 241-1 and 241-2, and the number of the multiplexers 330-1 and 330-2 may all be the same.

When the CPU 210 transmits an indication signal IND for indicating an initialization operation to the register 320, the register 320 may transmit selection signals SEL1 and SEL2 to the multiplexers 330-1 and 330-2, respectively, in response to the indication signal IND.

The DRAM PHY 241-1 and the DRAM PHY 241-2 may receive the initialization signals IV1 and IV2 through two third paths PATH3, respectively, in the same manner as described with respect to FIG. 6A. The DRAM PHY 241-1 and the DRAM PHY 241-2 may transmit the initialization signals IV1 and IV2 to the DRAMs 130-1 and 130-2, respectively. The DRAMs 130-1 and 130-2 may be initialized using data included in the initialization signals IV1 and IV2, respectively.

Referring to FIG. 6C, the DRAM 130 may include a data region 131 and a parity region 132 which may be the same as the data region 131 and the parity region 132, respectively, shown in FIG. 3C in structure and function.

The DRAM PHY 241-1 and the DRAM PHY 241-2 may simultaneously receive the initialization signals IV1 and IV2 through the two third paths PATH3 in the same manner as described with respect to FIGS. 6A and 6B. The DRAM PHY 241-1 and the DRAM PHY 241-2 may simultaneously transmit the initialization signals IV1 and IV2 to the data region 131 and the parity region 132, respectively. The data region 131 and the parity region 132 may be simultaneously initialized using data included in the initialization signals IV1 and IV2, respectively.

Referring to FIGS. 6B and 6C, it is shown that the initialization signals IV1 and IV2 are generated by one memory set 310 and one register 320; however, it is not limited thereto. That is, the multiplexers 330-1 and 330-2 may be connected to different memory sets and different registers, respectively. The different memory sets and the different registers may be independently operated by control of the CPU 210.

Figure 7A:
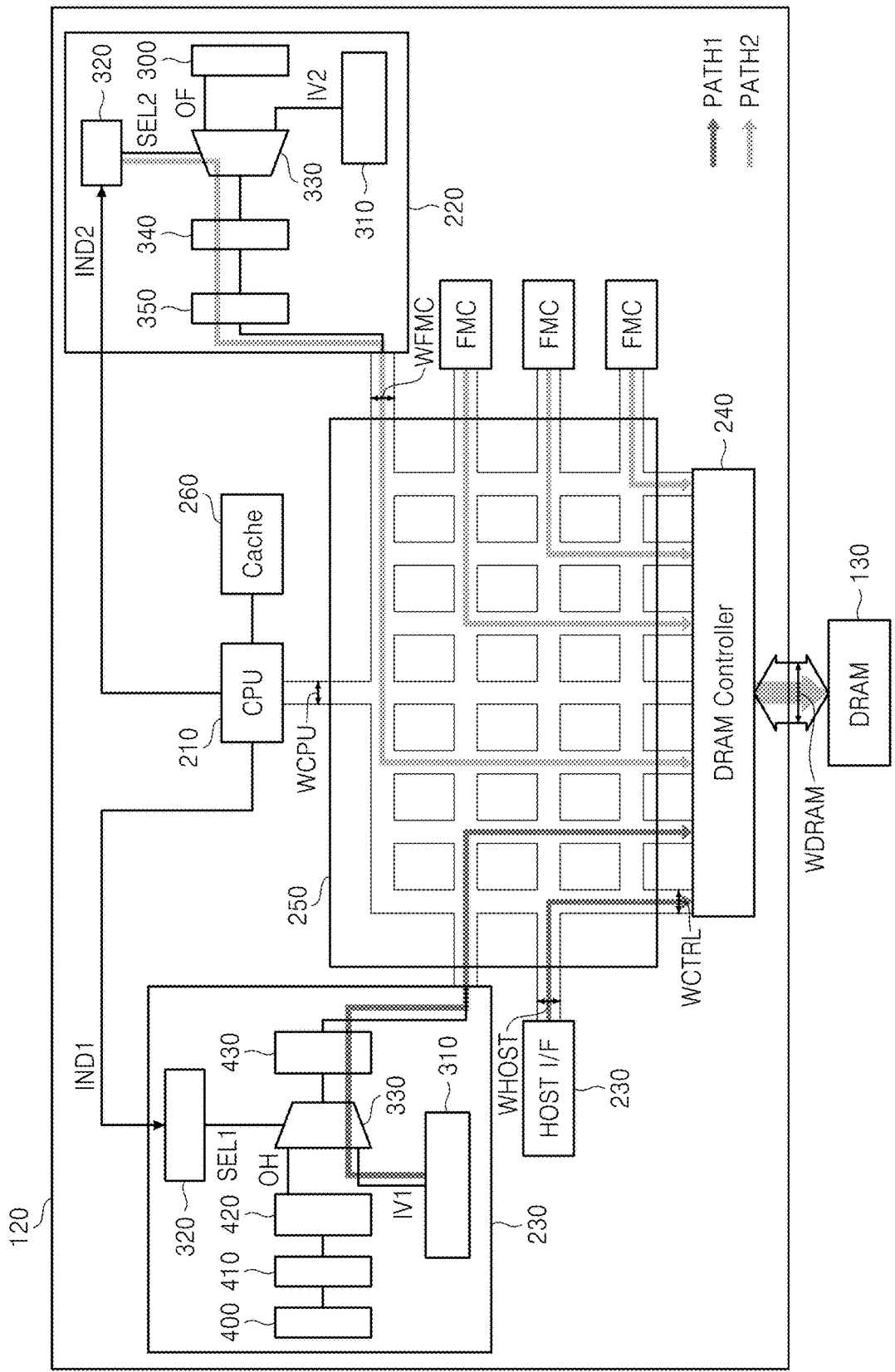
FIG. 7A is a block diagram of the SSD controller shown in FIG. 2 when one DRAM is initialized by the FMC and the host interface, according to an exemplary embodiment.
Figure 7B:
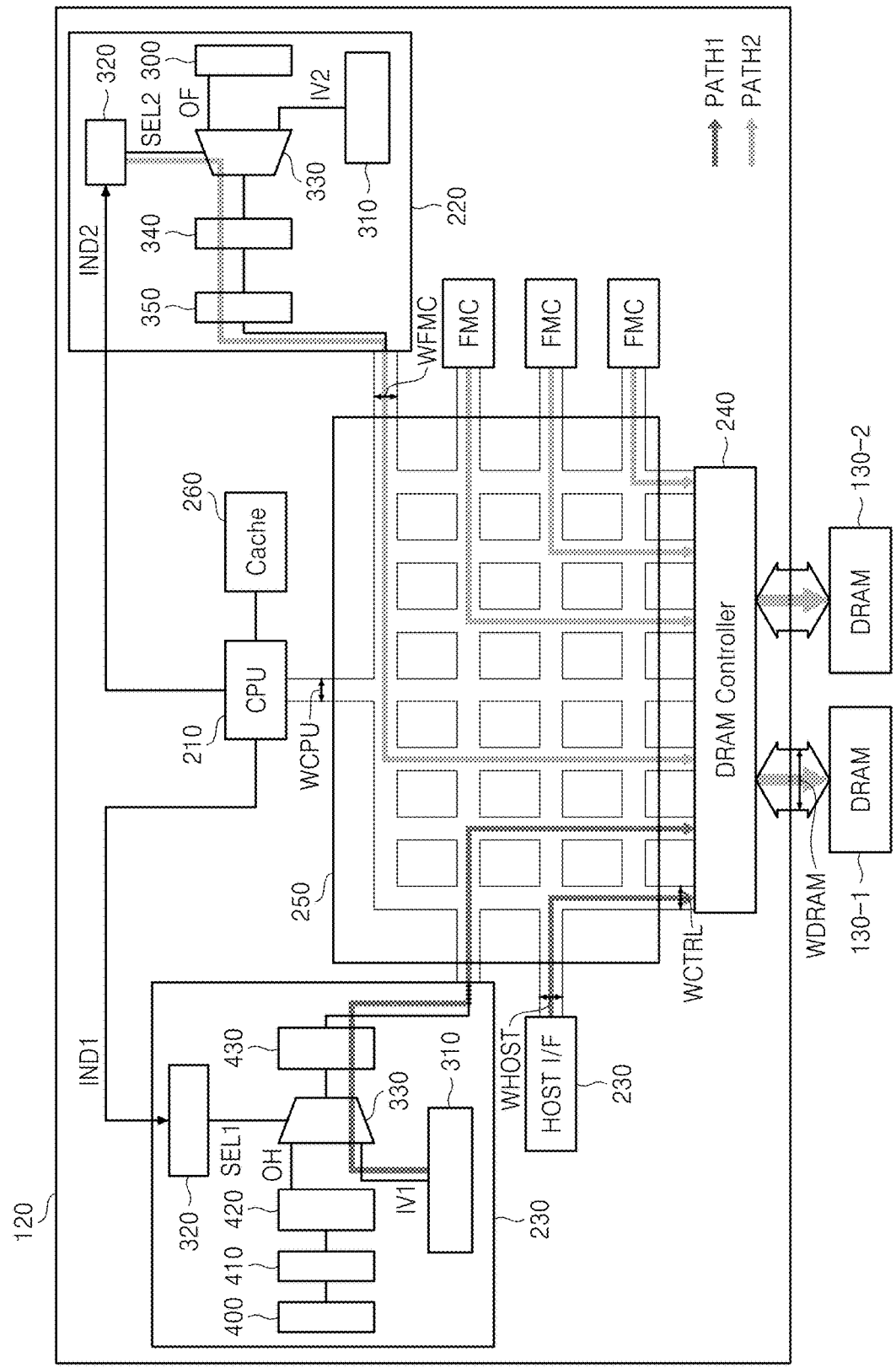
FIG. 7B is a block diagram of the SSD controller shown in FIG. 2 when two or more DRAMs are initialized by the FMC and the host interface, according to an exemplary embodiment.
Figure 7C:
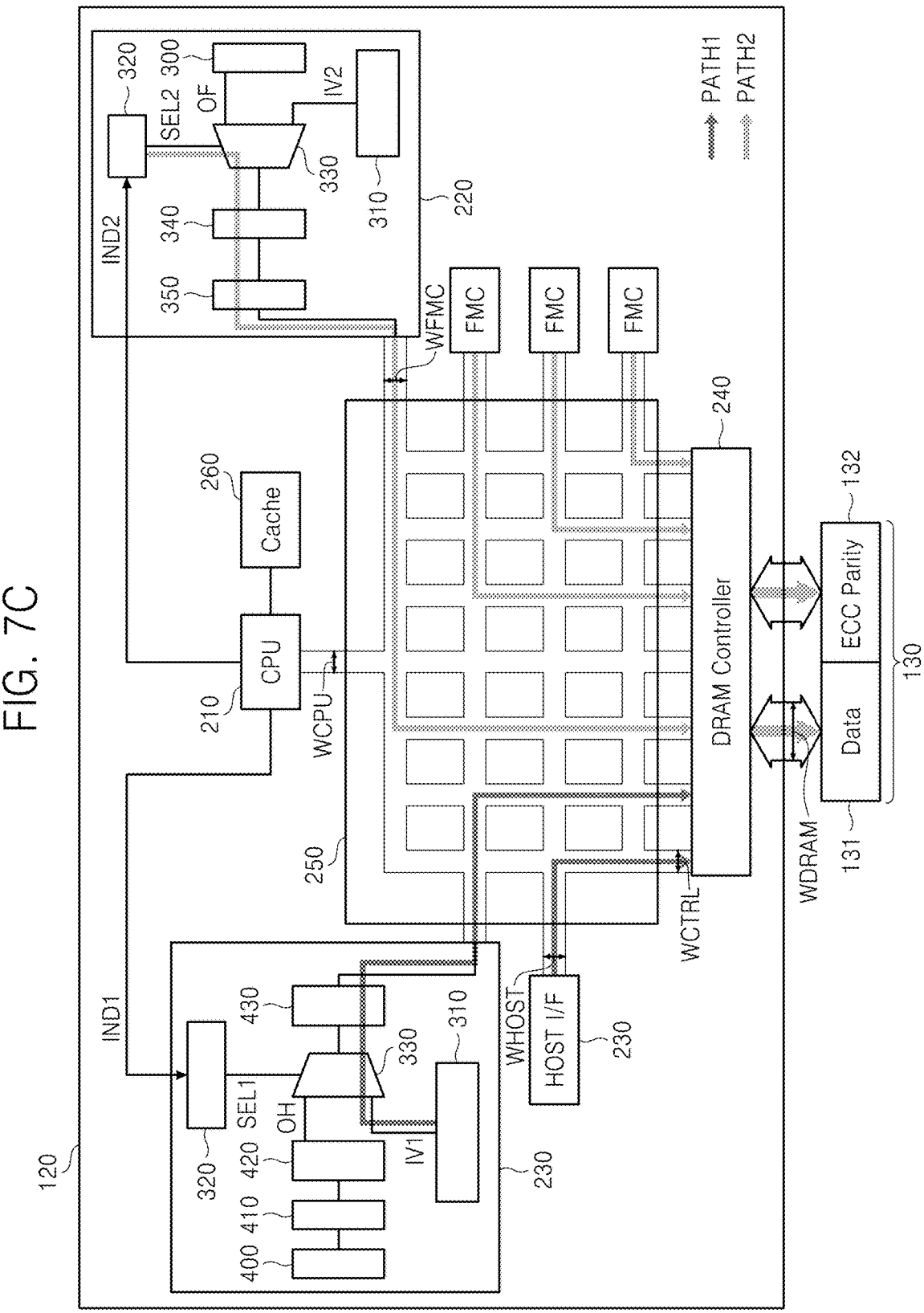
FIG. 7C is a block diagram of the SSD controller shown in FIG. 2 when the data region and the parity region included in the DRAM are initialized by the FMC and the host interface, according to an exemplary embodiment.

FIG. 7A is a block diagram of the SSD controller 120 shown in FIG. 2 when one DRAM is initialized by an FMC and a host interface, according to an exemplary embodiment, FIG. 7B is a block diagram of the SSD controller 120 shown in FIG. 2 when two or more DRAMs are initialized by an FMC and a host interface, according to an exemplary embodiment, and FIG. 7C is a block diagram of the SSD controller 120 shown in FIG. 2 when a data region and a parity region included in a DRAM are initialized by an FMC and a host interface, according to an exemplary embodiment.

Referring to FIGS. 7A, 7B, and 7C, the CPU 210 may transmit an indication signal IND2 for indicating an initialization operation to the register 320 included in the FMC 220, and transmit an indication signal IND1 for indicating an initialization operation to the register 320 included in the host interface 230. The indication signals IND1 and IND2 may include the same or different information according to a system design.

The memory set 310 included in the host interface 230 outputs an initialization signal IV1 in response to the indication signal IND1, and the memory set 310 included in the FMC 230 may output an initialization signal IV2 in response to the indication signal IND2.

The initialization signals IV1 and IV2 may include the same or different information according to a system design.

Referring to FIG. 7A, the DRAM controller 240 may receive the initialization signals IV1 and IV2 through the first path PATH1 and the second path PATH2, respectively, in the same manner as described with respect to FIGS. 3A and 5A. The DRAM controller 240 may transmit the initialization signals IV1 and IV2 transmitted through the first path PATH1 and the second path PATH2 to the DRAM 130, and the DRAM 130 may be initialized using data included in the initialization signals IV1 and IV2.

Referring to FIG. 7B, the SSD 100 may include the DRAMs 130-1 and 130-2. Only the two DRAMs 130-1 and 130-2 are shown in FIG. 7B; however, the number of DRAMs may be changed according to a system design. A sum of bandwidths WDRAM of buses connecting the DRAM controller 240 and the DRAMs 130-1 and 130-2 may be equal to a sum of bandwidths WCTRL of buses connecting the DRAM controller 240 and the bus matrix 250.

The DRAM controller 240 may receive the initialization signals IV1 and IV2 through the first path PATH1 and the second path PATH2, respectively, in the same manner as described with respect to FIG. 7A. The DRAM controller 240 may simultaneously transmit the initialization signals IV1 and IV2 to the DRAMs 130-1 and 130-2, respectively. The DRAMs 130-1 and 130-2 may be simultaneously initialized using data included in the initialization signals IV1 and IV2.

Referring to FIG. 7C, the DRAM 130 may include a data region 131 and a parity region 132 which may be the same as the data region 131 and the parity region 132 shown in FIG. 3C, respectively, in structure and function.

The DRAM controller 240 may receive the information signals IV1 and IV2 through the first path PATH1 and the second path PATH2, respectively, in the same manner as described with respect to FIGS. 7A and 7B. The DRAM controller 240 may simultaneously transmit the information signals IV1 and IV2 to the data region 131 and the parity region 132, respectively. The data region 131 and the parity region 132 may be simultaneously initialized using data included in the initialization signals IV1 and IV2.

Figure 8A:
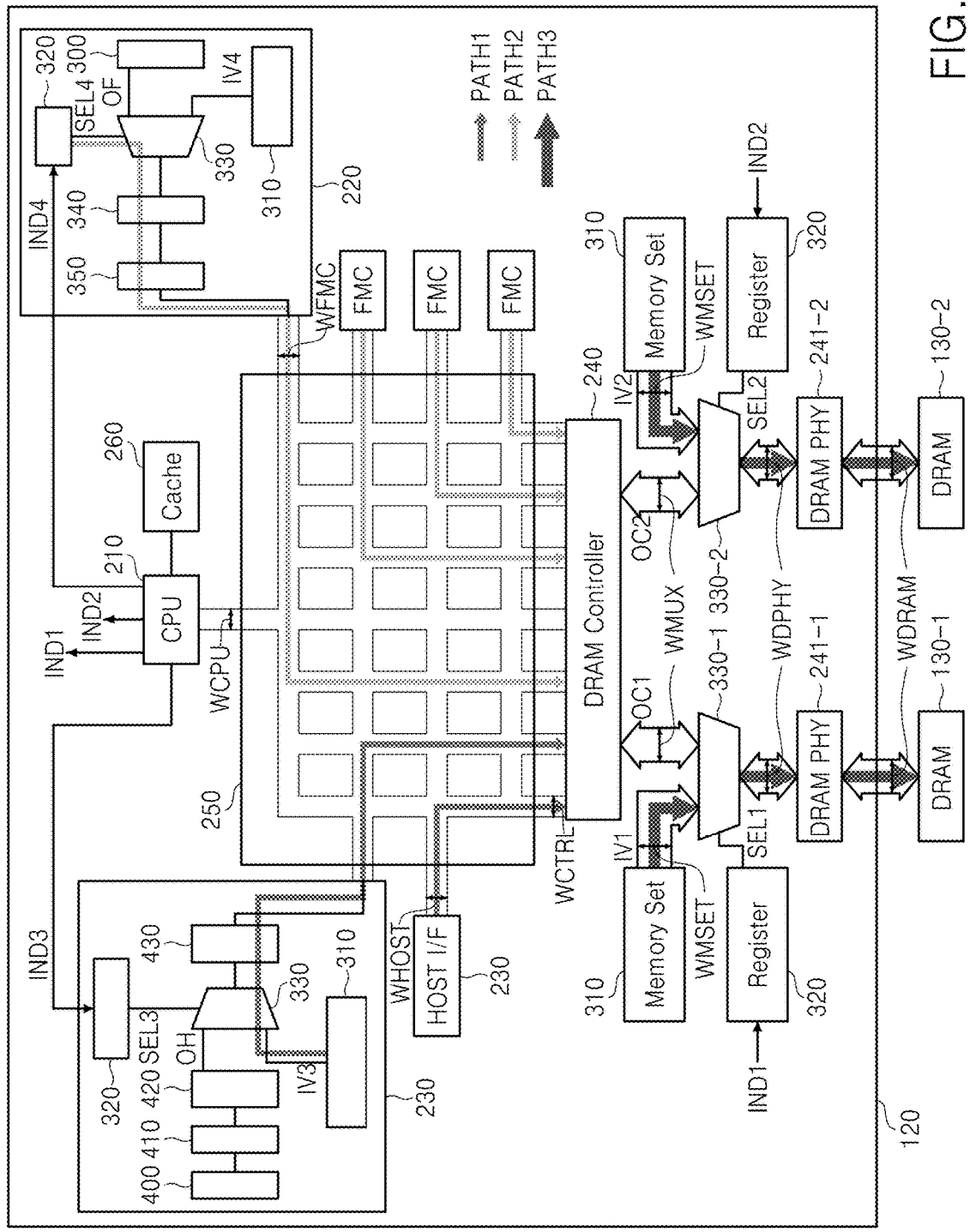
FIG. 8A is a block diagram of the SSD controller shown in FIG. 2 when two or more DRAMs are initialized by the flash memory controller, the host interface, and the DRAM controller, according to an exemplary embodiment.
Figure 8B:
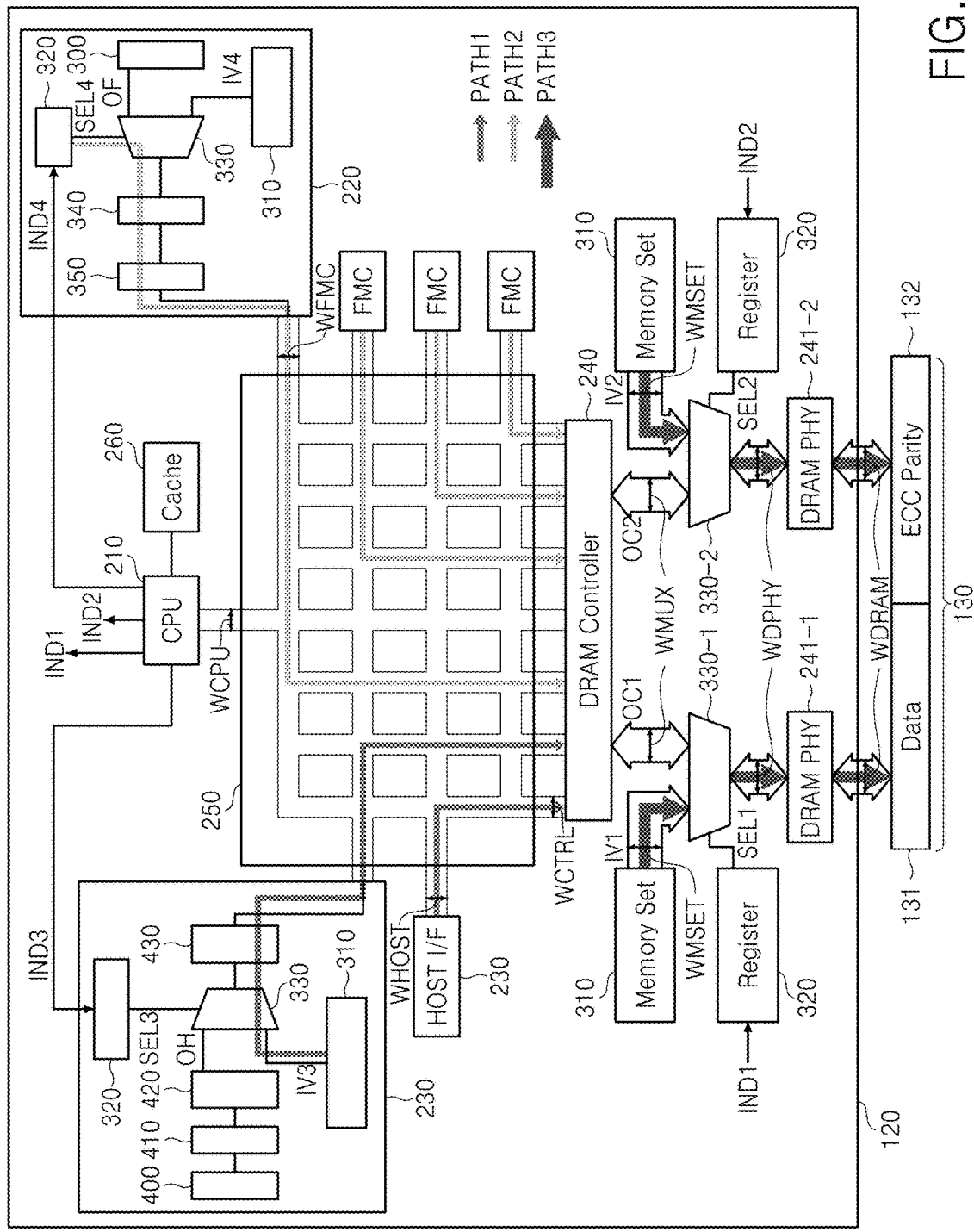
FIG. 8B is a block diagram of the SSD controller shown in FIG. 2 when the data region and the parity region included in the DRAM are initialized by the flash memory controller, the host interface, and the DRAM controller, according to an exemplary embodiment.

FIG. 8A is a block diagram of the SSD controller 120 shown in FIG. 2 when two or more DRAMs are initialized by an FMC, a host interface, and a DRAM controller, according to an exemplary embodiment, and FIG. 8B is a block diagram of the SSD controller 120 shown in FIG. 2 when a data region and a parity region included in a DRAM are initialized by an FMC, a host interface, and a DRAM controller, according to an exemplary embodiment.

Referring to FIGS. 8A and 8B, the CPU 210 may transmit an indication signal IND1 for indicating an initialization operation to the register 320 connected to the multiplexer 330-1, transmit an indication signal IND2 for indicating an initialization operation to the register 320 connected to the multiplexer 330-2, transmit an indication signal IND3 for indicating an initialization operation to the register 320 included in the host interface 230, and transmit an indication signal IND4 for indicating an initialization operation to the register 320 included in the FMC 220. The indication signals IND1, IND2, IND3, and IND4 may include the same or different information according to a system design.

The two memory sets 310 may output initialization signals IV1 and IV2 in response to the indication signals IND1 and IND2, respectively. The memory set 310 included in the host interface 230 may output an initialization signal IV3 in response to the indication signal IND3, and the memory set 310 included in the FMC 220 may output an initialization signal IV4 in response to the indication signal IND4.

The initialization signals IV1, IV2, IV3, and IV4 may include the same or different information according to a system design.

Referring to FIG. 8A, the SSD 100 may include the DRAMs 130-1 and 130-2. Only the two DRAMs 130-1 and 130-2 are shown in FIG. 8A; however, the number of DRAMs may be changed according to a system design.

The DRAM controller 240 may receive the initialization signals IV3 and IV4 through the first path PATH1 and the second path PATH2, respectively, in the same manner as described with respect to FIGS. 3A and 5A. One of the DRAMs 130-1 and 130-2 may be initialized using at least one of the initialization signals IV3 and IV4, and simultaneously, the other of the DRAMs 130-1 and 130-2 may be initialized using at least one of the initialization signals IV1 and IV2 through at least one of the third paths PATH3.

For example, the DRAM controller 240 may transmit the initialization signals IV3 and IV4 received through the first path PATH1 and the second path PATH2 to the DRAM 130-1 or 130-2 (for example, 130-1) through the DRAM PHY 241-1 or 241-2 (for example, 241-1), The DRAM 130-1 or 130-2 (for example, 130-1) which received the initialization signal IV3 and IV4 may be initialized using the initialization signals IV3 and IV4.

At this time, the CPU 210 may transmit an indication signal IND2 for indicating an initialization operation of the DRAM 130-1 or 130-2 (for example, 130-2) to the register 320 related to the DRAM 130-1 or 130-2 (for example, 130-2) which did not receive at least one of the initialization signals IV3 and IV4 through the DRAM controller 240, and the DRAM 130-1 or 130-2 (for example, 130-2) may be initialized using the initialization signal IV1 or IV2 (for example, IV2) of the memory set 310 at the same time as the DRAM 130-1 or 130-2 (for example, 130-1) is initialized.

Referring to FIG. 8B, the DRAM 130 may include a data region 131 and a parity region 132 which may be the same as the data region 131 and the parity region 132 shown in FIG. 3C, respectively, in structure and function.

The DRAM controller 240 may receive the initialization signals IV3 and IV4 through the first path PATH1 and the second path PATH2, respectively, in the same manner as described with respect to FIG. 8A.

One of the data region 131 and the parity region 132 may be initialized using at least one of the initialization signals IV3 and IV4, and simultaneously, the other of the data region 131 and the parity region 132 may be initialized through at least one of the two third paths PATH3 using at least one of the initialization signals IV1 and IV2.

For example, the DRAM controller 240 may transmit the initialization signals IV3 and IV4 received through the first path PATH1 and the second path PATH2, respectively, to the data region 131 through the DRAM PHY 241-1 or 241-2 (for example, 241-1). The data region 131 may be initialized using the initialization signals IV3 and IV4.

At this time, the CPU 210 may transmit an indication signal IND2 for indicating an initialization operation of the parity region 132 to the register 320 related to the parity region 132, and the parity region 132 may be initialized using the initialization signal IV1 or IV2 (for example, IV2) of the memory set 310 at the same time as the data region 131 is initialized.

Figure 9:
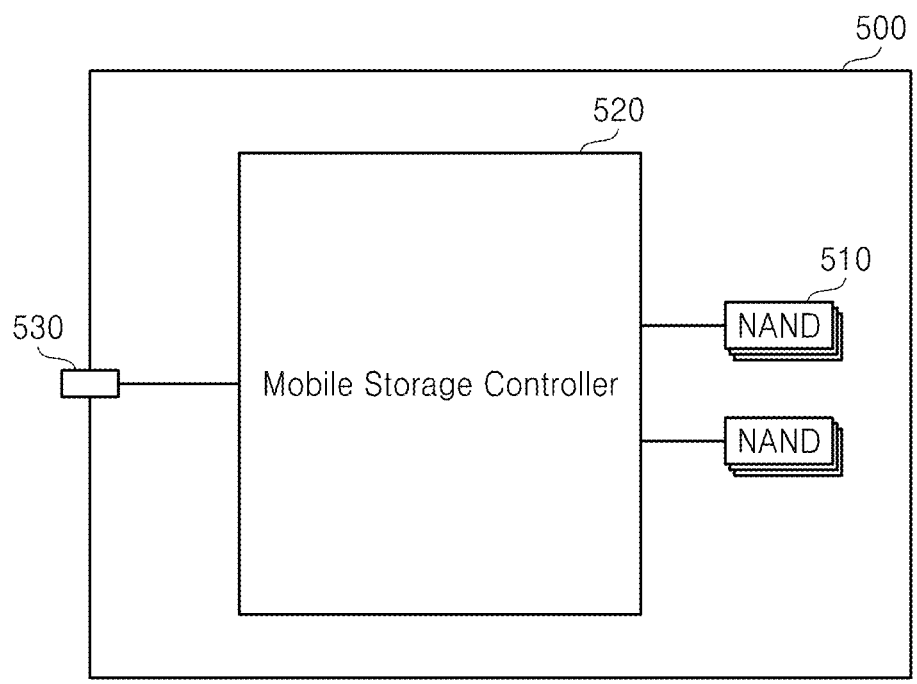
FIG. 9 is a block diagram of a mobile storage, according to an exemplary embodiment.

FIG. 9 is a block diagram of a mobile storage, according to an exemplary embodiment. Referring to FIG. 9, a mobile storage 500 may include a plurality of NAND flash memories 510, a mobile storage controller 520, and a connector 530.

The NAND flash memories 510 may store data transmitted from a host. For convenience of description, two NAND flash memories 110 are shown in FIG. 9; however, it is not limited thereto. That is, the number of NAND flash memories 510 included in the mobile storage 500 may be changed according to a system design.

The NAND flash memories 510 may include a three-dimensional memory cell array. The three-dimensional memory cell array may be monolithically formed in one or more physical levels of an array of memory cells having an active region disposed on or above a silicon substrate, and may include a circuit related to an operation of the memory cells. The circuit may be formed inside or on or above the substrate. As discussed with respect to FIG. 1, the term of "monolithic" refers to a direct deposition of layers of each level on layers of each underlying level of the array.

The three-dimensional memory cell array may include a vertical NAND string vertically oriented so that at least one memory cell is positioned on or above another memory cell. The at least one memory cell may include a charge trap layer.

The mobile storage controller 520 may generally control an operation of the mobile storage 500. The mobile storage controller 520 may read data from the NAND flash memories 510, transmit the data to the outside through the connector 530, and write data transmitted from the outside to the NAND flash memories 110.

The mobile storage 500 may be connected to a host through the connector 530. The connector 530 may include a pad(s). According to exemplary embodiments, the number of the pad(s) may be the same as the number of host interfaces included in the mobile storage controller 520.

The mobile storage 500 may be embodied in a universal flash storage (UFS), a multimedia card (MMC), an embedded MMC (eMMC), or a Perfect Page New (PPN) NAND; however, it is not limited thereto.

Figure 10:
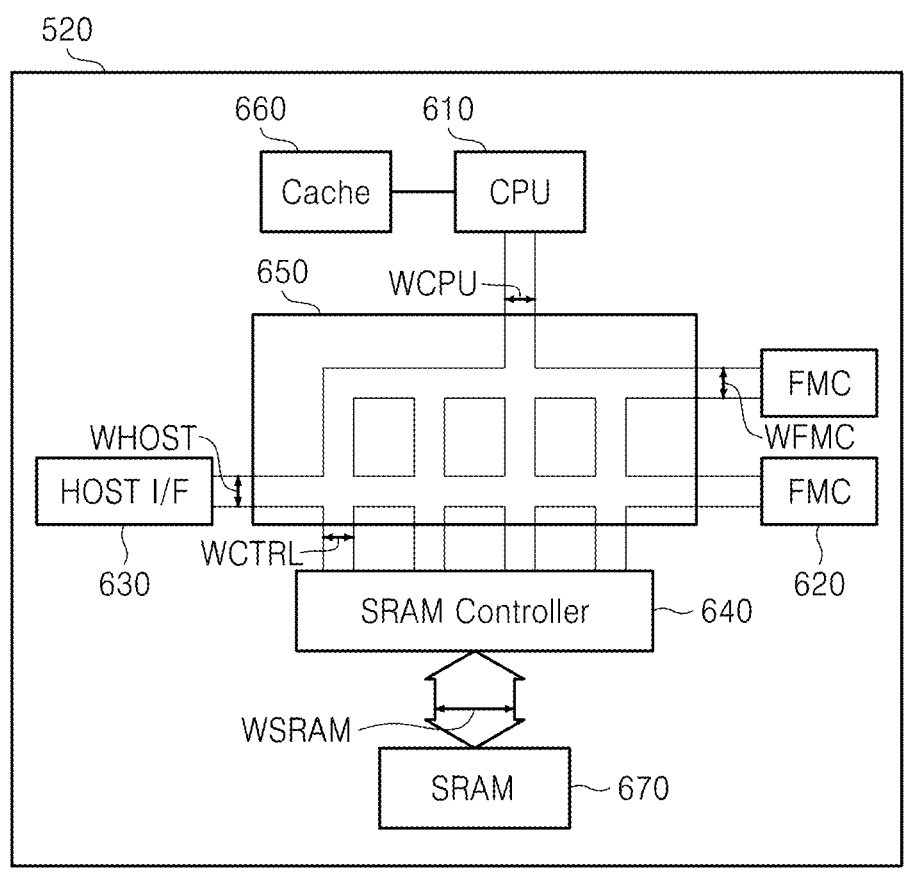
FIG. 10 is a block diagram of a mobile storage controller shown in FIG. 9, according to an exemplary embodiment.

FIG. 10 is a block diagram of the mobile storage controller 520 shown in FIG. 9. Referring to FIG. 10, the mobile storage controller 520 may include a CPU 610, an FMC 620, a host interface 630, a SRAM controller 640, a bus matrix 650, a cache 660, and an SRAM 670. The CPU 610 may generally control an operation of the mobile storage controller 520.

The FMC 620 may control at least one of the NAND flash memories 510 according to a control of the CPU 610. When data stored in the NAND flash memory 510 may be read or data may be written to the NAND flash memory 510 according to a control of the FMC 620.

For convenience of description, two FMCs 620 are shown in FIG. 10; however, it is not limited thereto. That is, the number of FMCs 620 may be changed according to a system design. The number of the FMCs 620 may be the same as the number of the NAND flash memories 510.

The host interface 630 may change a format of data transmitted to a host to be used by the host, and transmit data having a changed format to the host through the connector 530. Moreover, the host interface 630 may receive data transmitted from the host, change a format of received data, and transmit the data having a changed format to the NAND flash memory 510. According to exemplary embodiments, the host interface 630 may include a transceiver for transmitting and receiving data.

For convenience of description, one host interface 630 is shown in FIG. 10; however, it is not limited thereto. That is, the number of the host interfaces 630 may be changed according to a system design. The number of the host interfaces 630 may be the same as the number of pads included in the connector 530.

The host interface 630 may be embodied by a SATA interface, a SATAe interface, a SAS interface, a PCIe interface, or an NVMe interface; however, it is not limited thereto.

The SRAM controller 640 may write data to the SRAM 670 or read data from the SRAM 670 according to a control of the CPU 610. Data processed by the SRAM controller 640 may be transmitted to the FMC 620 or the host interface 630.

The CPU 510, the FMC 520, the host interface 530, and the SRAM controller 540 may communicate with one another through the bus matrix 650. The bus matrix 650 may be embodied in AMBA, AHB, APB, AXI, ASB, or a combination of these; however, it is not limited thereto.

The cache 660 may store data necessary for an operation of the CPU 610, and transmit the data to the CPU 610 according to a request of the CPU 610. According to exemplary embodiments, the cache 660 may be embodied by another SRAM.

The SRAM 670 may be used as a cache (or buffer) of the mobile storage 500. The SRAM 670 may temporarily store data stored in the NAND flash memory 510 or data loaded from the NAND flash memory 110. The SRAM 670 may be referred to as a main memory of the mobile storage 500 or a mobile computing device including the mobile storage 500.

A bandwidth WCPU of a bus connecting the CPU 610 an the bus matrix 650 may be narrower than each of a bandwidth WHOST of a bus connecting the host interface 630 and the bus matrix 650, a bandwidth WFMC of a bus connecting the FMC 620 and the bus matrix 650, and a bandwidth WCTRL of a bus connecting the SRAM controller 640 and the bus matrix 650.

A bandwidth WSRAM of a bus connecting the SRAM controller 640 and the SRAM 670 may be equal to each of a sum of the bandwidths WHOST of buses connecting the host interfaces 630 and the bus matrix 650, a sum of the bandwidths WFMC of buses connecting the FMCs 620 and the bus matrix 650, and the bandwidth WCPU of the bus connecting the CPU 610 and the bus matrix 650.

The bandwidth WSRAM of the bus connecting the SRAM controller 640 and the SRAM 670 may be equal to a sum of bandwidths WCTRL of buses connecting the SRAM controller 640 and the bus matrix 650.

Figure 11A:
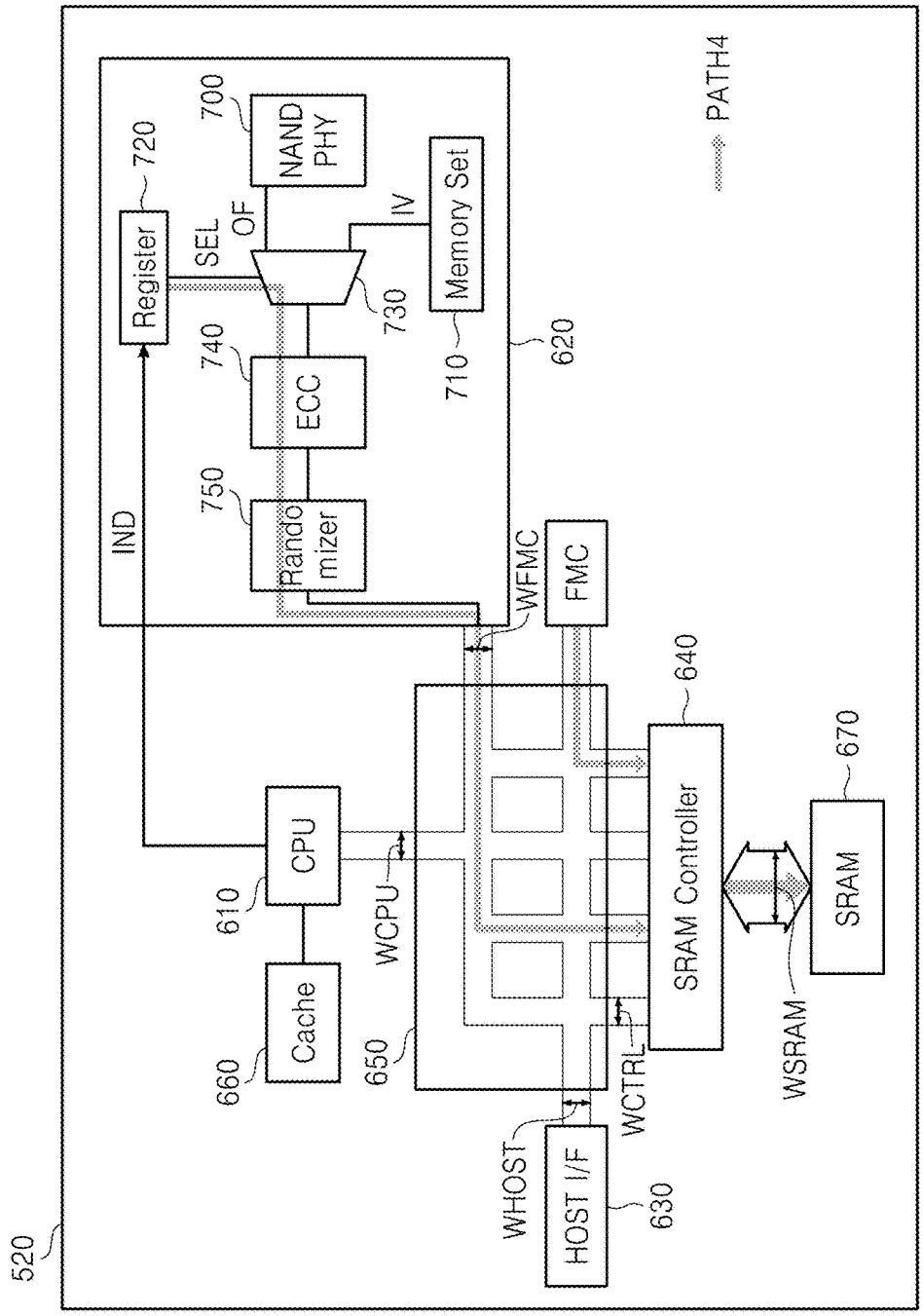
FIG. 11A is a block diagram of the mobile storage controller shown in FIG. 10 when one SRAM is initialized by the FMC, according to an exemplary embodiment.
Figure 11B:
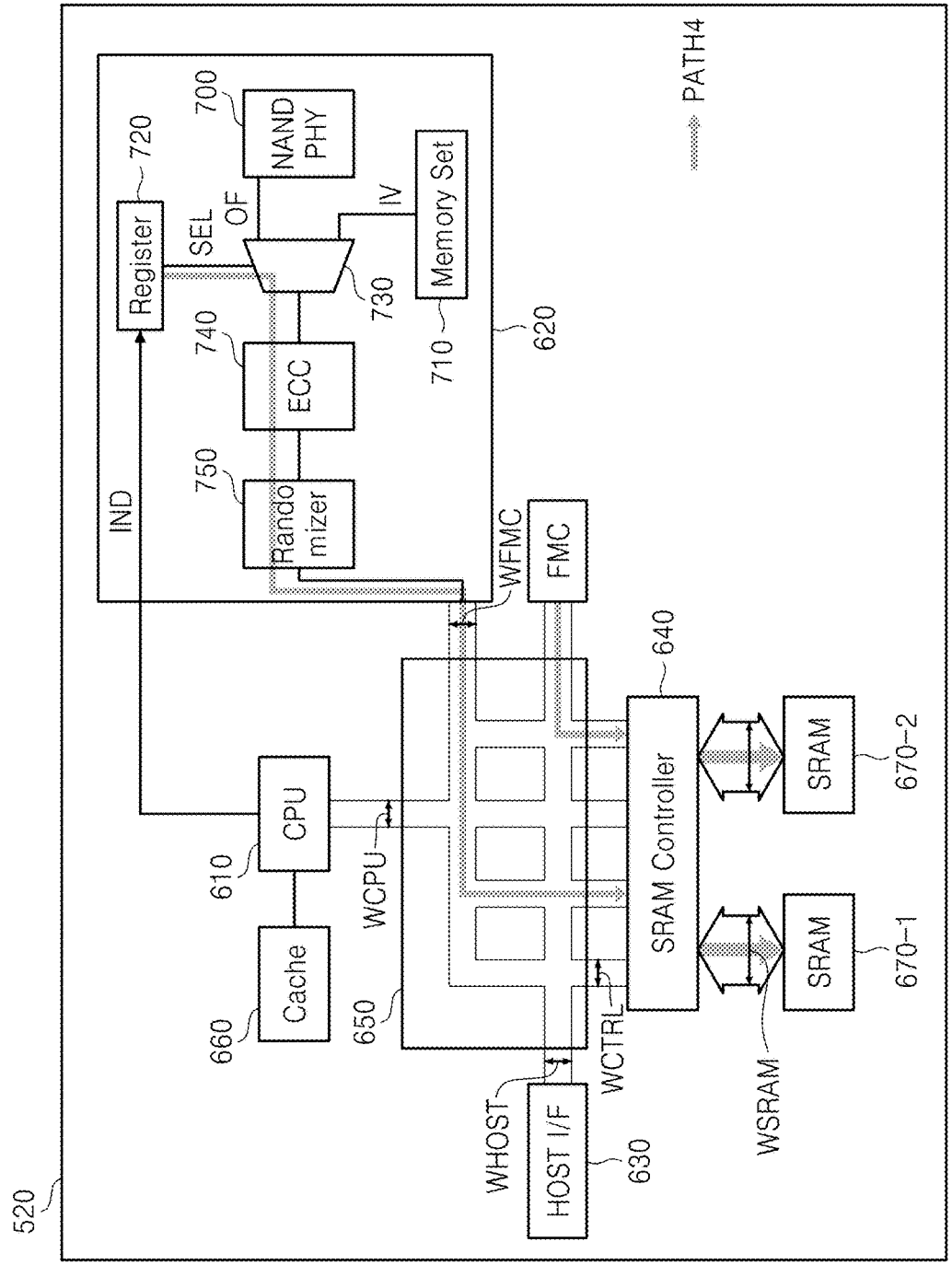
FIG. 11B is a block diagram of the mobile storage controller shown in FIG. 10 when two or more SRAMs are initialized by the FMC, according to an exemplary embodiment.
Figure 11C:
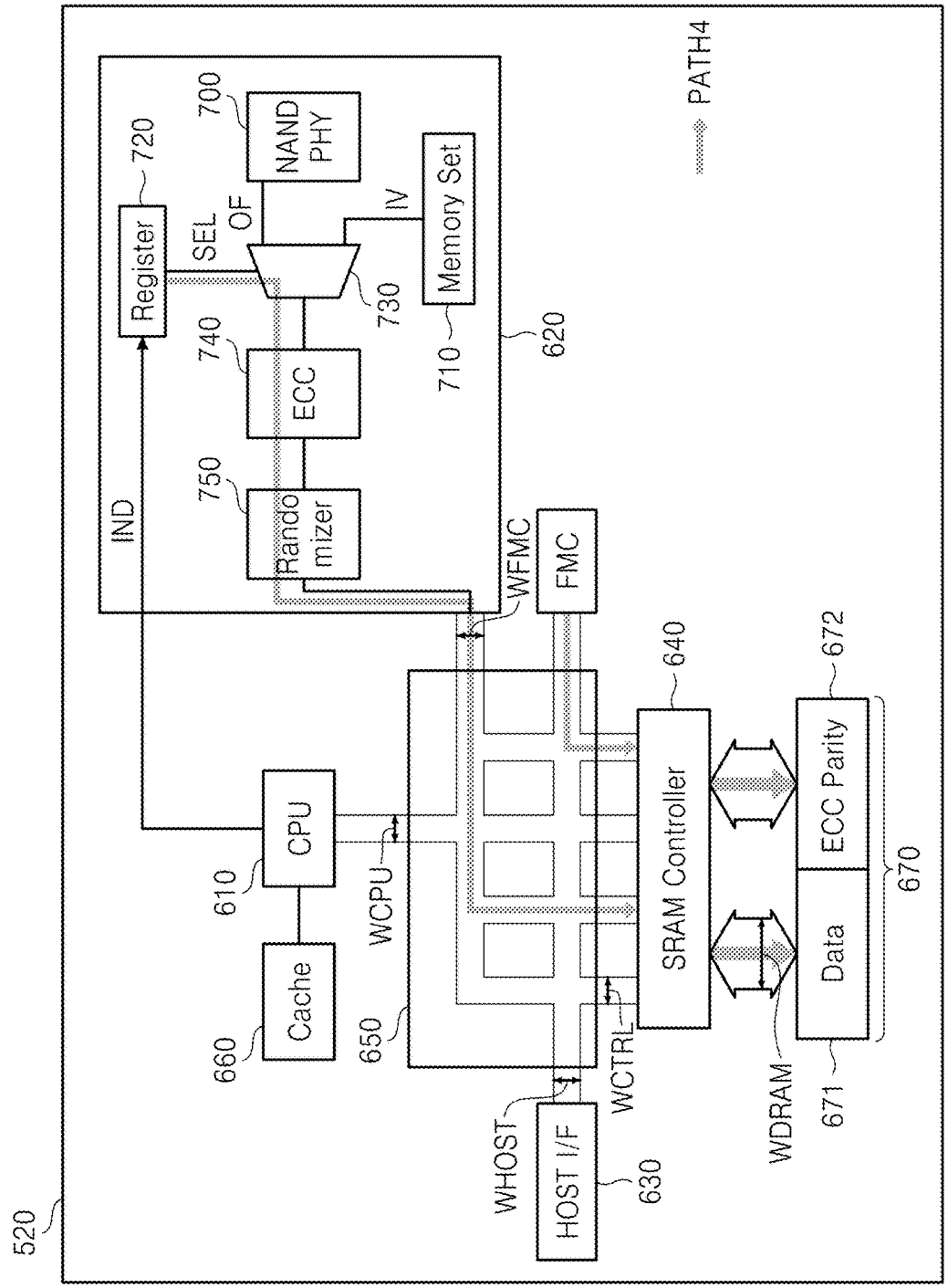
FIG. 11C is a block diagram of the mobile storage controller shown in FIG. 10 when a data region and a parity region included in the SRAM are initialized by the FMC, according to an exemplary embodiment.

FIG. 11A is a block diagram of the mobile storage controller 520 shown in FIG. 10 when one SRAM is initialized by an FMC, according to an exemplary embodiment, FIG. 11B is a block diagram of the mobile storage controller 520 shown in FIG. 10 when two or more SRAMs are initialized by an FMC, according to an exemplary embodiment, and FIG. 11C is a block diagram of the mobile storage controller 520 shown in FIG. 10 when a data region and a parity region included in an SRAM are initialized by the FMC, according to an exemplary embodiment.

Referring to FIGS. 11A, 11B, and 11C, the FMC 620 may include a NAND PHY 700, a memory set 710, a register 720, a multiplexer 730, an ECC circuit 740, and a randomizer 750.

The NAND PHY 700, the memory set 710, the register 720, the multiplexer 730, the ECC circuit 740, and the randomizer 750 may be the same as those shown in FIG. 3A, respectively, in structure and function. Accordingly, description thereabout will be omitted when the exemplary embodiments illustrated in FIGS. 11A, 11B, and 11C are described below.

Referring to FIG. 11A, when the CPU 610 transmits an indication signal IND for indicating an initialization operation to the register 720, the register 720 may transmit a selection signal SEL corresponding to the indication signal IND to the multiplexer 330. The memory set 710 may output an initialization signal IV corresponding to the selection signal SEL to the multiplexer 730, and the initialization signal IV may be transmitted to the SRAM controller 640 through the ECC circuit 740 and the randomizer 750.

For convenience of description, a block diagram of only one FMC 620 is shown in FIG. 11A; however, the other FMC 620 may have the same internal configuration as the FMC 620 as shown in FIG. 11A. Accordingly, as described above, each of the two FMCs 620 may transmit an initialization signal IV to the SRAM controller 640 through a fourth path PATH4. The SRAM controller 640 may transmit the initialization signal IV transmitted through the fourth path PATH4 to the SRAM 670, and the SRAM 670 may be initialized using data included in the initialization signal IV.

Referring to FIG. 11B, the mobile storage controller 520 may include SRAMs 670-1 and 670-2. Two SRAMs 6760-1 and 670-2 are shown in FIG. 11B; however, the number of SRAMs may be changed according to a system design.

A sum of bandwidths of buses connecting the SRAM controller 640 and the SRAMs 670-1 and 670-2 may be equal to a sum of the bandwidths WCTRL of buses connecting the SRAM controller 640 and the bus matrix 650.

The SRAM controller 640 may receive the initialization signal IV through the fourth path PATH4 in the same manner as described with respect to FIG. 11A. The SRAM controller 640 may simultaneously transmit the initialization signal IV to the SRAMs 670-1 and 670-2. The SRAMs 670-1 and 670-2 may be simultaneously initialized using data included in the initialization signal IV.

Referring to FIG. 11C, the SRAM 670 may include a data region 671 and a parity region 672. The data region 671 may store meta information and a mapping table of the NAND flash memories 510. The parity region 672 may store error detection data for detecting an error of data stored in the data region 671.

A sum of a bandwidth WSRAM of a bus connecting the SRAM controller 640 and the data region 671 and a bandwidth of a bus WSRAM connecting the SRAM controller 640 and the parity region 672 may be equal to a sum of the bandwidths WCTRL of buses connecting the SRAM controller 640 and the bus matrix 650.

The SRAM controller 640 may receive the initialization signal IV through the fourth path PATH4 in the same manner as described with respect to FIGS. 11A and 11B. The SRAM controller 640 may simultaneously transmit the initialization signal IV to the data region 671 and the parity region 672. The data region 671 and the parity region 672 may be simultaneously initialized using data included in the initialization signal IV.

Figure 12A:
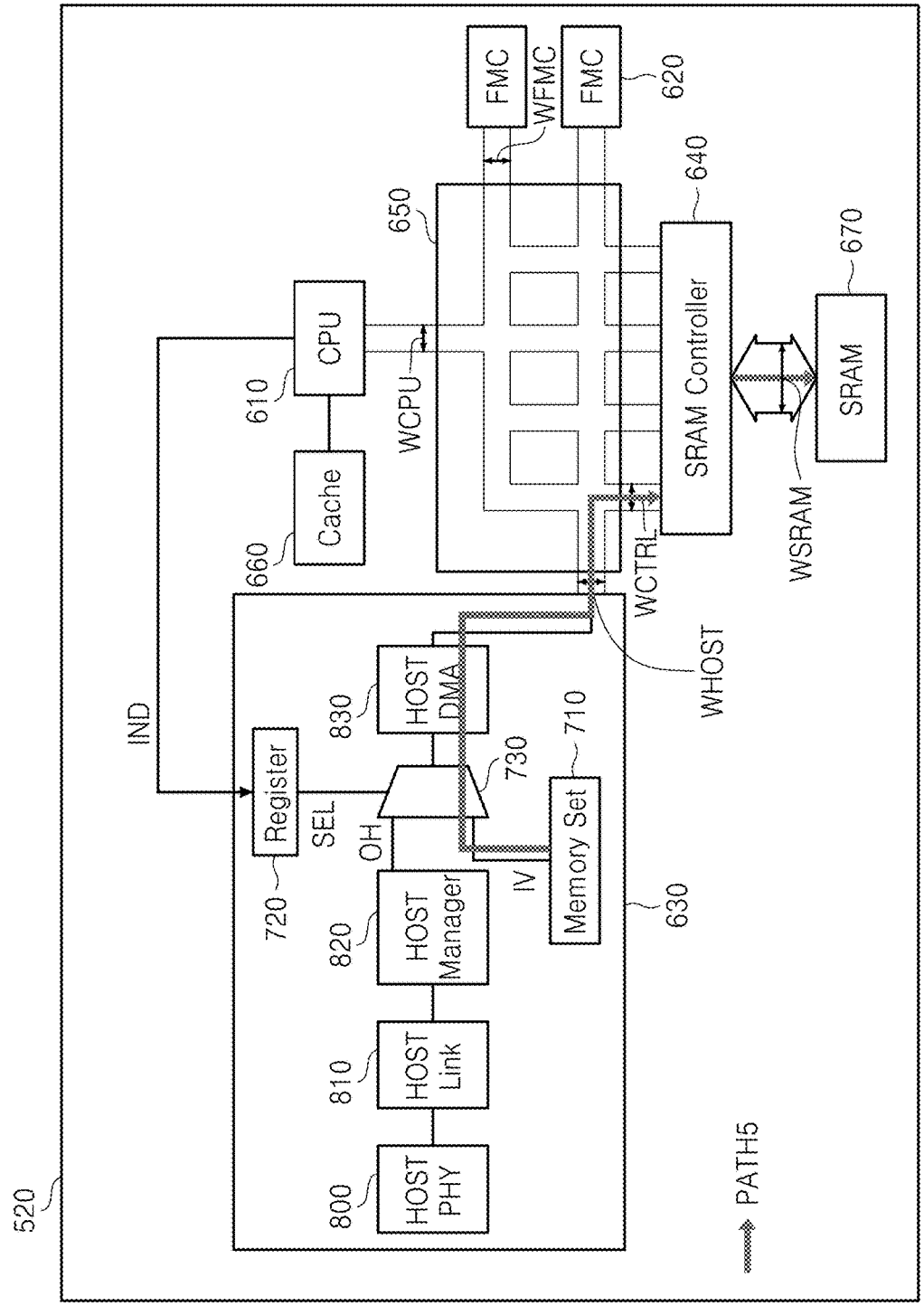
FIG. 12A is a block diagram of the mobile storage controller shown in FIG. 10 when one SRAM is initialized by the host interface, according to an exemplary embodiment.
Figure 12B:
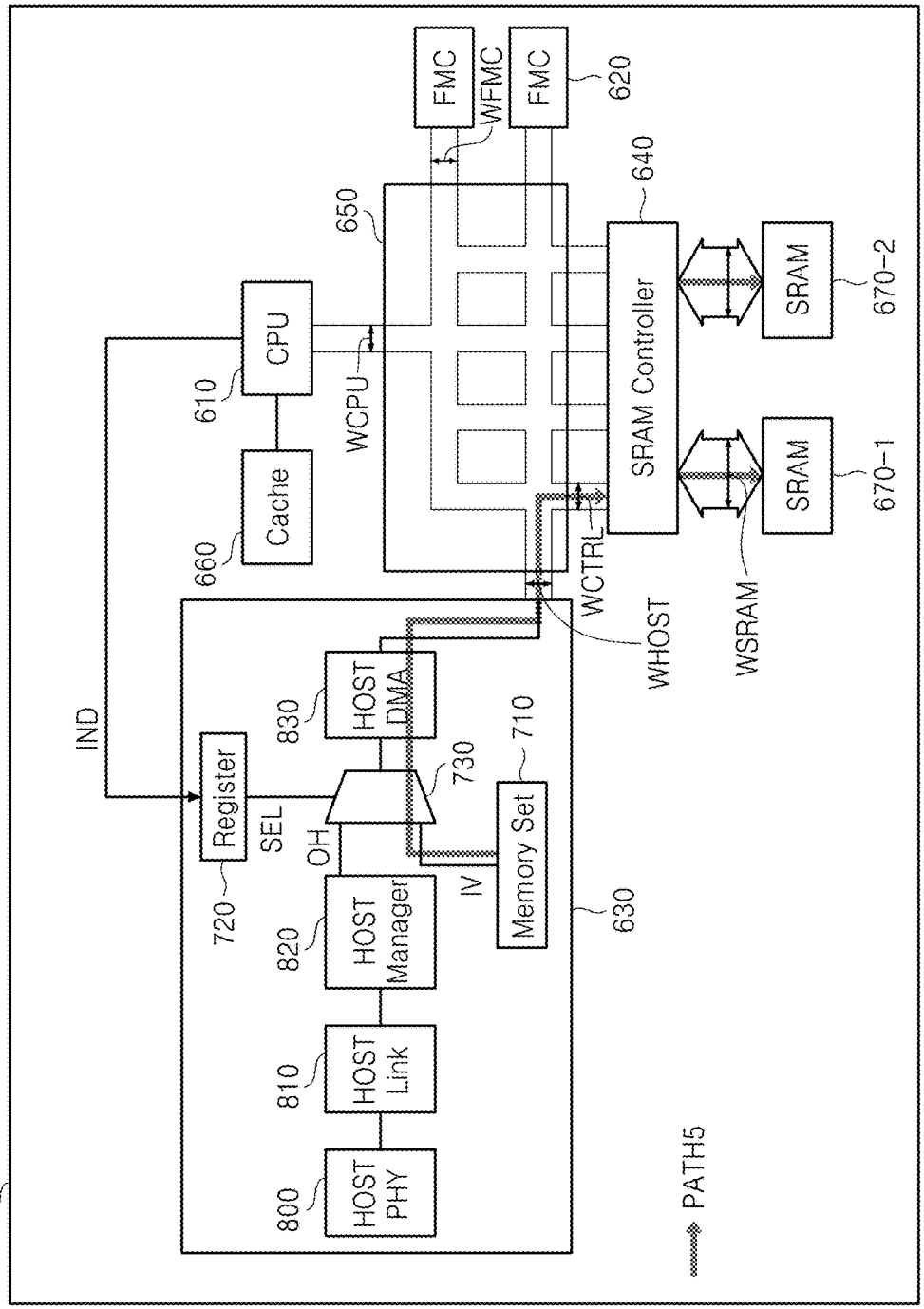
FIG. 12B is a block diagram of the mobile storage controller shown in FIG. 10 when two or more SRAMs are initialized by the host interface, according to an exemplary embodiment.
Figure 12C:
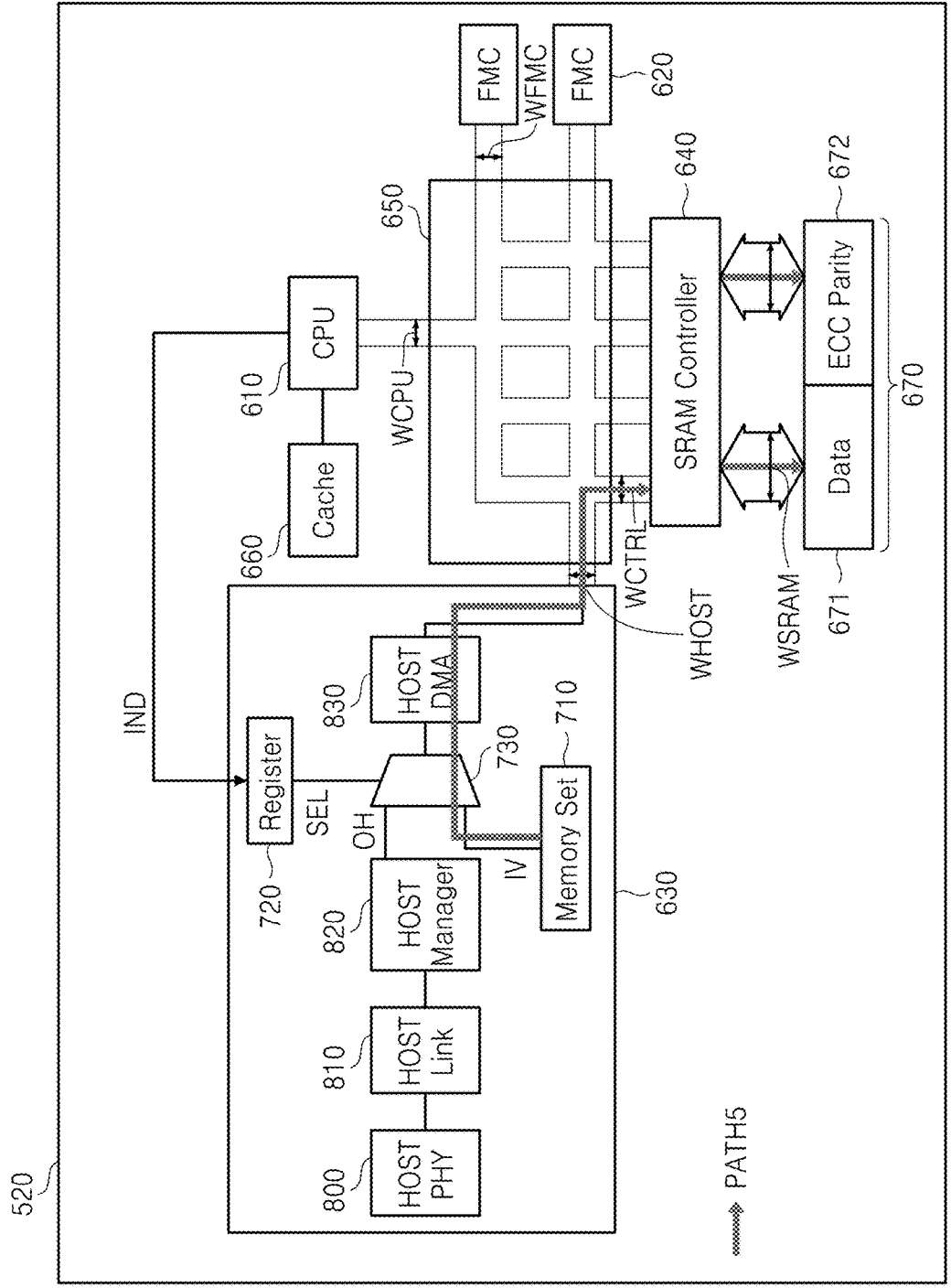
FIG. 12C is a block diagram of the mobile storage controller shown in FIG. 10 when the data region and the parity region included in the SRAM are initialized by the host interface, according to an exemplary embodiment.

FIG. 12A is a block diagram of the mobile storage controller 520 shown in FIG. 10 when one SRAM is initialized by a host interface, according to an exemplary embodiment, FIG. 12B is a block diagram of the mobile storage controller 520 shown in FIG. 10 when two or more SRAMs are initialized by a host interface, according to an exemplary embodiment, and FIG. 12C is a block diagram of the mobile storage controller 520 shown in FIG. 10 when a data region and a parity region included in an SRAM are initialized by a host interface, according to an exemplary embodiment.

Referring to FIGS. 12A, 12B, and 12C, the host interface 630 may include a host PHY 800, a host link 810, a host manager 820, a host DMA 830, a memory set 710, a register 720, and a multiplexer 730.

The host PHY 800, the host link 810, the host manager 820, and the host DMA 830 included in the host interface 630 may be the same as those shown in FIG. 5A, respectively, in structure and function. In addition, the memory set 710, the register 720, and the multiplexer 730 included in the host interface 630 may be the same as those show in FIG. 11A in structure and function.

Referring to FIG. 12A, when the CPU 610 transmits an indication signal IND for indicating an initialization operation to the register 720, the register 720 may transmit a selection signal SEL corresponding to the indication signal IND to the multiplexer 730.

The memory set 710 may output an initialization signal IV corresponding to the selection signal SEL to the multiplexer 730, and the initialization signal IV may be transmitted to the SRAM controller 640 through the host DMA 830.

For convenience of description, one host interface 230 is shown in FIG. 12A; however, the number of the host interfaces 230 may be changed according to a system design. At this time, a host interface not shown in FIG. 12A may have the same internal configuration as the host interface 230 shown in FIG. 12A, and transmit an initialization signal IV to the SRAM controller 640 through another fifth path PATH5.

The SRAM controller 640 may transmit the initialization signal IV transmitted through the fifth path PATH5 to the SRAM 670, and the SRAM 670 may be initialized using data included in the initialization signal IV.

Referring to FIG. 12B, the mobile storage controller 520 may include SRAMs 670-1 and 670-2. Two SRAMs 670-1 and 670-2 are shown in FIG. 12B; however, the number of SRAMs may be changed according to a system design. A sum of bandwidths WSRAM of buses connecting the SRAM controller 640 and the SRAMs 670-1 and 670-2 may be equal to a sum of the bandwidths WCTRL of buses connecting the DRAM controller 240 and the bus matrix 650.

The SRAM controller 640 may receive initialization signal IV through the fifth path PATH5 in the same manner as described in FIG. 12A. The SRAM controller 640 may simultaneously transmit the initialization signal IV to each of the SRAMs 670-1 and 670-2. The SRAMs 670-1 and 670-2 may be simultaneously initialized using data included in the initialization signal IV.

Referring to FIG. 12C, the SRAM 670 may include a data region 671 and a parity region 672 which may be the same as the data region 671 and the parity region 632, respectively, shown in FIG. 11C in structure and function.

A sum of a bandwidth WSRAM of a bus connecting the SRAM controller 640 and the data region 671 and a bandwidth WSRAM of a bus connecting the SRAM controller 640 and the parity region 672 may be equal to a sum of the bandwidths WCTRL of buses connecting the SRAM controller 640 and the bus matrix 650.

The SRAM controller 640 may receive an initialization signal IV through the fifth path PATH5 in the same manner as described with respect to FIGS. 11A and 11B. The SRAM controller 640 may simultaneously transmit the initialization signal IV to the data region 671 and the parity region 672. The data region 131 and the parity region 132 may be simultaneously initialized using data included in the initialization signal IV.

Figure 13A:
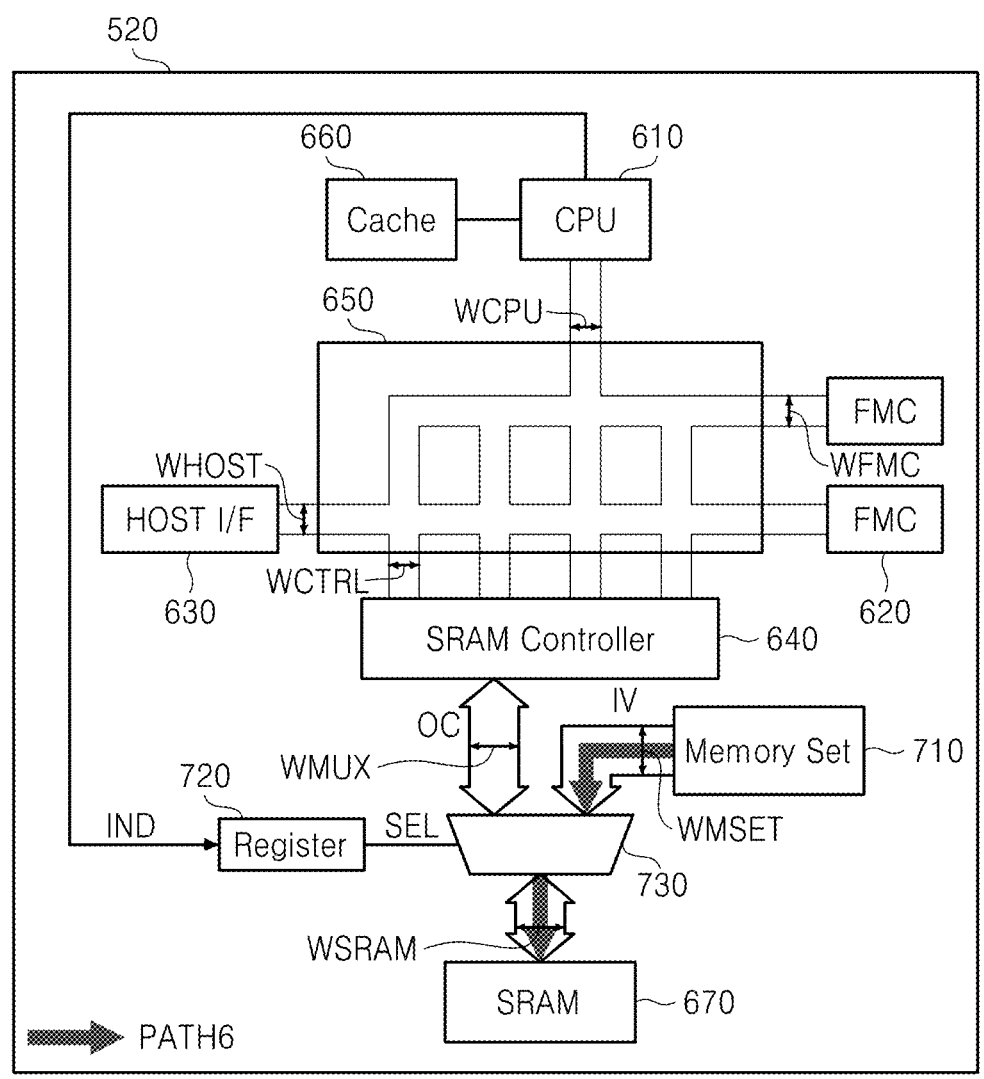
FIG. 13A is a block diagram of the mobile storage controller shown in FIG. 10 when one SRAM is initialized by an SRAM controller, according to an exemplary embodiment.
Figure 13B:
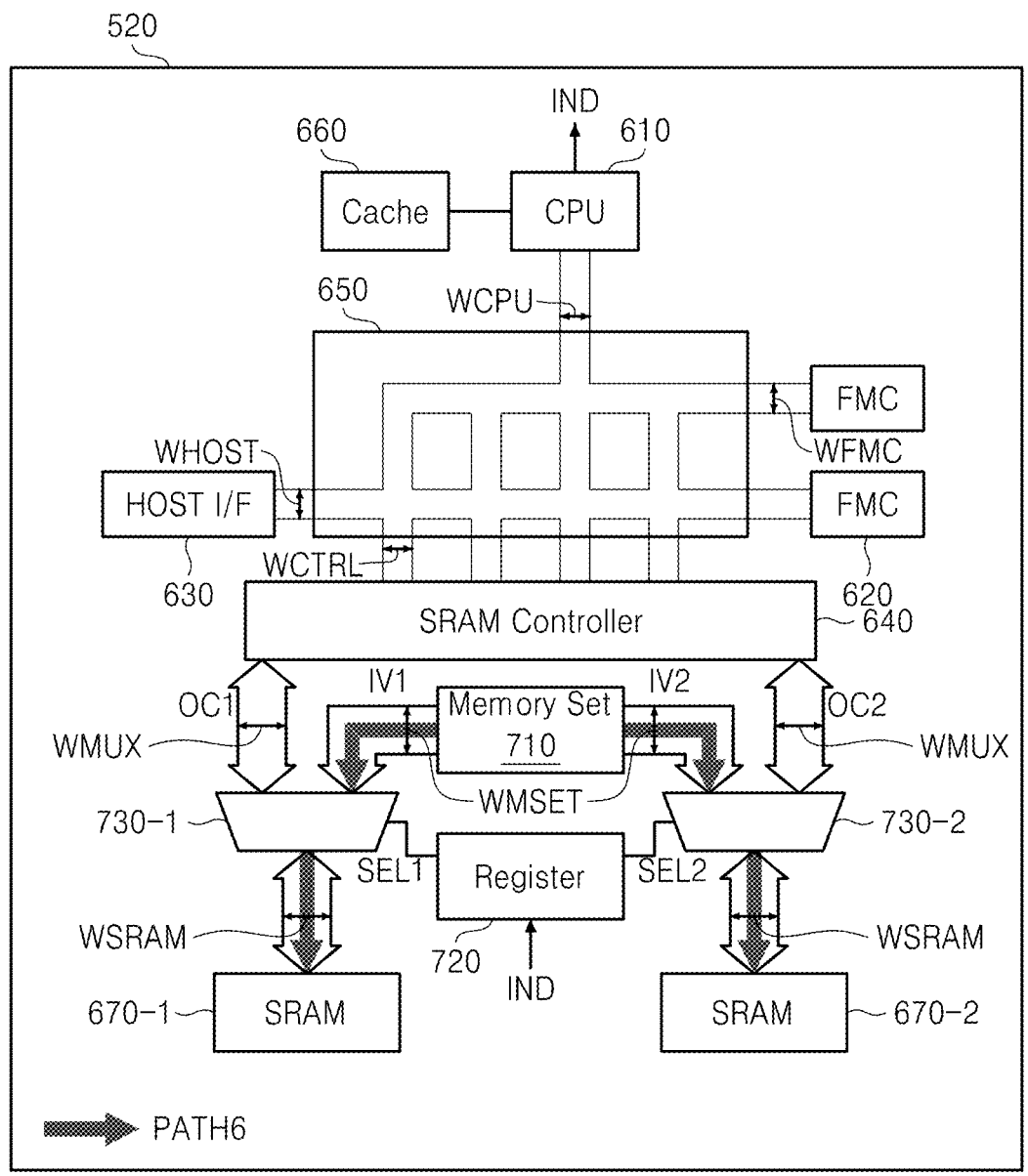
FIG. 13B is a block diagram of the mobile storage controller shown in FIG. 10 when two or more SRAMs are initialized by the SRAM controller, according to an exemplary embodiment.
Figure 13C:
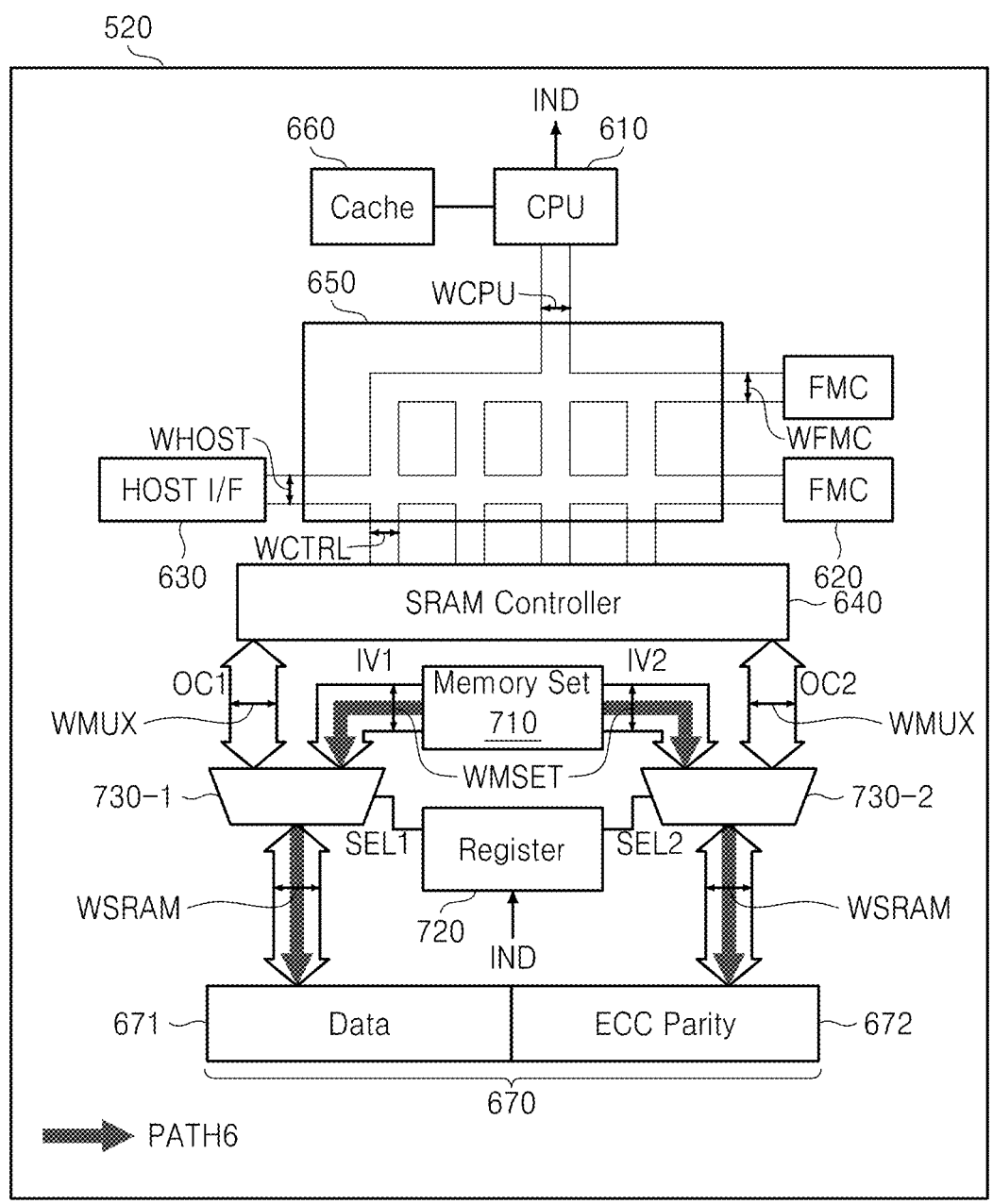
FIG. 13C is a block diagram of the mobile storage controller shown in FIG. 10 when the data region and the parity region included in the SRAM are initialized by the SRAM controller, according to an exemplary embodiment.

FIG. 13A is a block diagram of the mobile storage controller 520 shown in FIG. 10 when one SRAM is initialized by an SRAM controller, according to an exemplary embodiment, FIG. 13B is a block diagram of the mobile storage controller 520 shown in FIG. 10 when two or more SRAMs are initialized by an SRAM controller, according to an exemplary embodiment, and FIG. 13C is a block diagram of the mobile storage controller 520 shown in FIG. 10 when a data region and a parity region included in an SRAM are initialized by an SRAM controller, according to an exemplary embodiment.

Referring to FIGS. 13A, 13B, and 13C, the SRAM controller 520 may include a memory set 710, a register 720, and a multiplexer 730.

The memory set 710, the register 720, and the multiplexer 730 shown in FIG. 13A may be the same as those shown in FIG. 11A, respectively, in structure and function.

According to exemplary embodiments, the memory set 710, the register 720, and the multiplexer 730 shown in FIG. 13A may be included in the SRAM controller 640. Even in this case, a connection type of the memory set 710, the register 720, and the multiplexer 730 may be the same as in FIG. 13A.

Referring to FIG. 13A, a bandwidth WMUX of a bus connecting the SRAM controller 640 and the multiplexer 730, a bandwidth WMSET of a bus connecting the memory set 710 and the multiplexer 730, and a bandwidth WSRAM of a bus connecting the multiplexer 730 and the SRAM 670 may be all equal to one another.

When the CPU 210 transmits an indication signal IND for indicating an initialization operation to the register 720, the register 720 may transmit a selection signal SEL corresponding to the indication signal IND to the multiplexer 730. The memory set 710 may output an initialization signal IV corresponding to the selection signal SEL through a sixth path PATH6 to the SRAM 670 through the multiplexer 730. The SRAM 670 may be initialized using data included in the initialization signal IV.

Referring to FIGS. 13B and 13C, the mobile storage controller 520 may include multiplexers 730-1 and 730-2. A sum of a bandwidth WMUX of a bus connecting the multiplexer 730-1 and the SRAM controller 640 and a bandwidth WMUX of a bus connecting the multiplexer 730-2 and the SRAM controller 640 may be equal to a sum of the bandwidths WCTRL of buses connecting the SRAM controller 640 and the bus matrix 650.

Initialization signals IV1 and IV2 output from the memory set 710 may include the same or different information according to a system design.

Selection signals SEL1 and SEL2 output from the register 720 may include the same or different information according to a system design.

Referring to FIG. 13B, the mobile storage controller 520 may include SRAMs 670-1 and 670-2. Two SRAMs 670-1 and 670-2 are shown in FIG. 13B; however, the number of SRAMs may be changed according to a system design. The number of the SRAMs 670-1 and 670-2 may be equal to the number of the multiplexers 730-1 and 730-2.

A sum of a bandwidth WMUX of a bus connecting the multiplexer 730-1 and the SRAM controller 640 and a bandwidth WMUX of a bus connecting the multiplexer 730-2 and the SRAM controller 640 may be equal to a sum of a bandwidth WMSET of a bus connecting the multiplexer 730-1 and the memory set 710 and a bandwidth WMSET of a bus connecting the multiplexer 730-2 and the memory set 710, and also, a sum of a bandwidth WSRAM of a bus connecting the multiplexer 730-1 and the SRAM 670-1 and a bandwidth WSRAM of a bus connecting the multiplexer 730-2 and the SRAM 670-2.

When the CPU 610 transmits an indication signal IND for indicating an initialization operation to the register 720, the register 720 may transmit selection signals SEL1 and SEL2 to the multiplexers 730-1 and 730-2, respectively, in response to the indication signal IND.

The SRAM 670-1 may receive initialization signal IV1 through the sixth path PATH6 in the same manner as described in FIG. 13A. The SRAM 670-2 may receive initialization signal IV2 through the sixth path PATH6 in the same manner as described in FIG. 13A.

The SRAM 670-1 may be initialized using data included in the initialization signal IV1, and simultaneously, the SRAM 670-2 may be initialized using data included in the initialization signal IV2.

Referring to FIG. 13C, the SRAM 670 may include a data region 671 and a parity region 672 which may be the same as the data region 671 and the parity region 672 shown in FIG. 11C, respectively, in structure and function.

A sum of a bandwidth WMUX of a bus connecting the multiplexer 730-1 and the SRAM controller 640 and a bandwidth WMUX of a bus connecting the multiplexer 730-2 and the SRAM controller 640 may be equal to at least one of a sum of a bandwidth WMSET of a bus connecting the multiplexer 730-1 and the memory set 710 and a bandwidth WMSET of a bus connecting the multiplexer 730-2 and the memory set 710 and a sum of a bandwidth WSRAM of s bus connecting the multiplexer 730-1 and the data region 671 and a sum of a bandwidth WSRAM of s bus connecting the multiplexer 730-2 and the parity region 672.

When the CPU 610 transmits an indication signal IND for indicating an initialization operation to the register 720, the register 720 may transmit the selection signals SEL1 and SEL2 to the multiplexers 730-1 and 730-2, respectively, in response to the indication signal IND.

The data region 671 may receive the initialization signal IV1 through a sixth path PATH6 in the same manner as described with respect to FIG. 13A. The parity region 132 may receive the initialization signal IV2 through another sixth path PATh6 in the same manner as describe with respect to FIG. 13A.

The data region 671 may be initialized using data included in the initialization signal IV1, and simultaneously, the parity region 672 may be initialized using data included in the initialization signal IV2.

Referring to FIGS. 13B and 13C, it is shown that the initialization signals IV1 and IV2 are generated by one memory set 710 and one register 720; however, it is not limited thereto. That is, according to exemplary embodiments, each of the multiplexers 730-1 and 730-2 may be connected to a different memory set and a different register. The different memory sets and the different registers may be independently operated by control of the CPU 610.

Figure 14A:
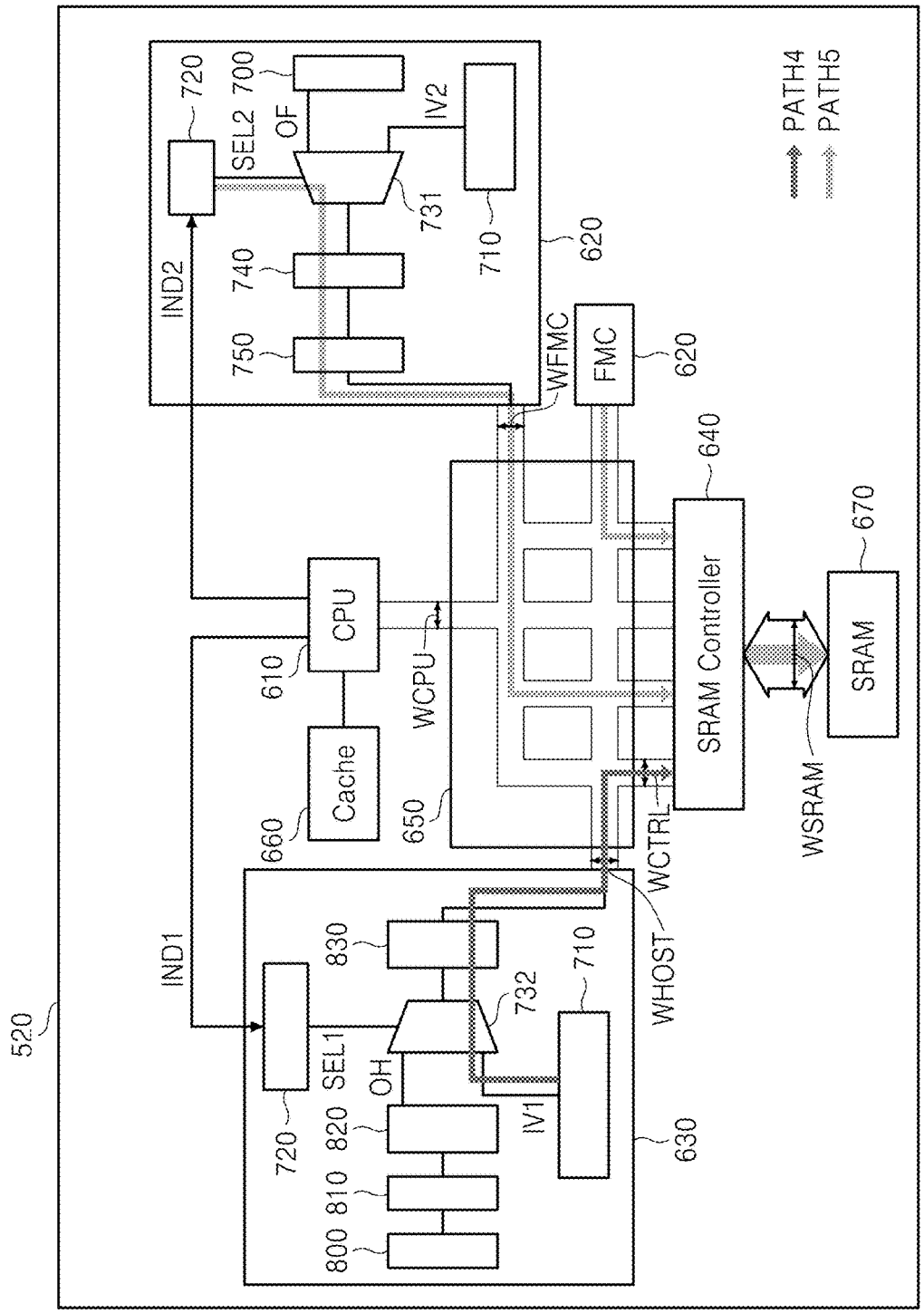
FIG. 14A is a block diagram of the mobile storage controller shown in FIG. 10 when one SRAM is initialized by the FMC and the host interface, according to an exemplary embodiment.
Figure 14B:
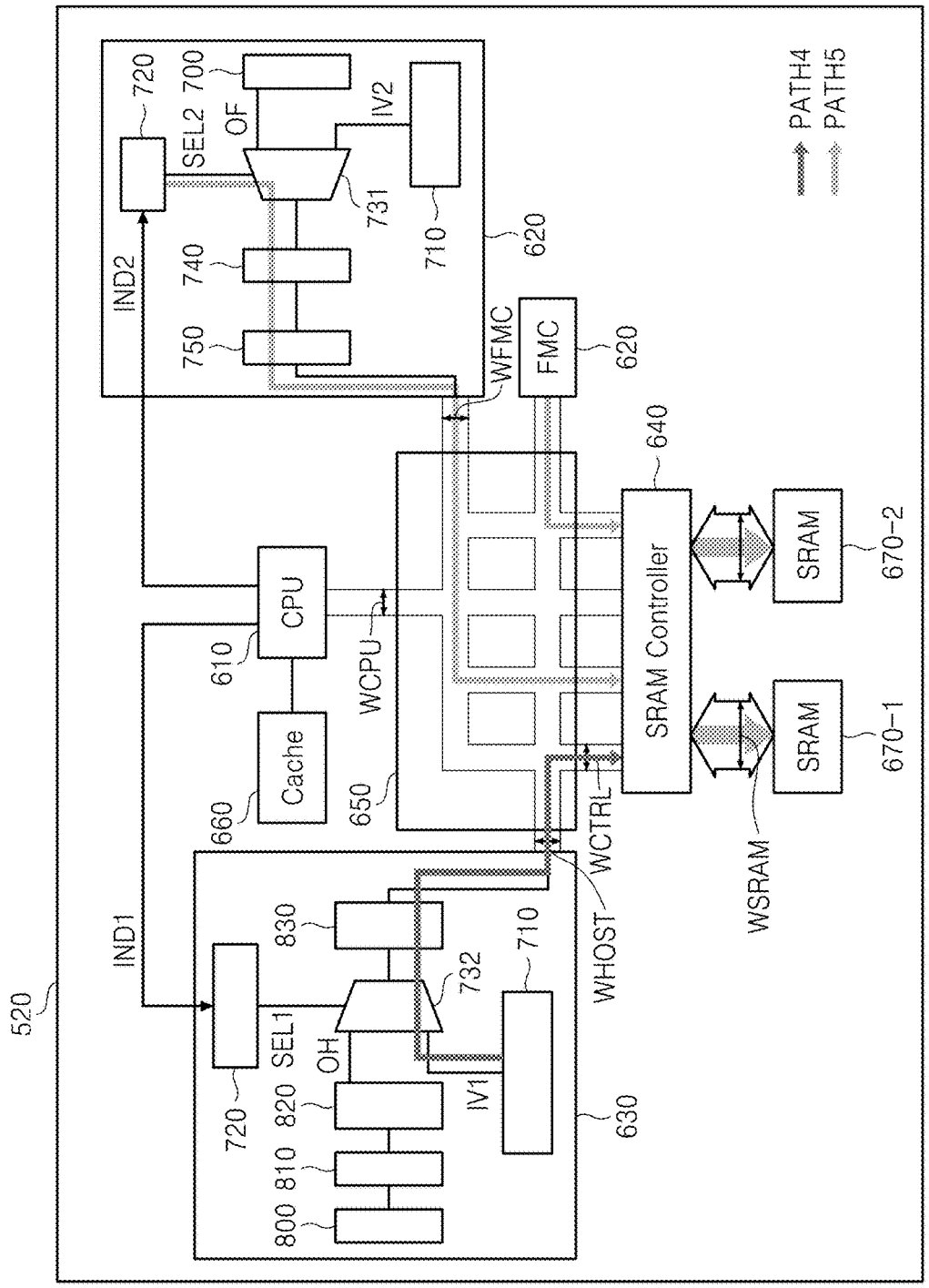
FIG. 14B is a block diagram of the mobile storage controller shown in FIG. 10 when two or more SRAMs are initialized by the FMC and the host interface, according to an exemplary embodiment.
Figure 14C:
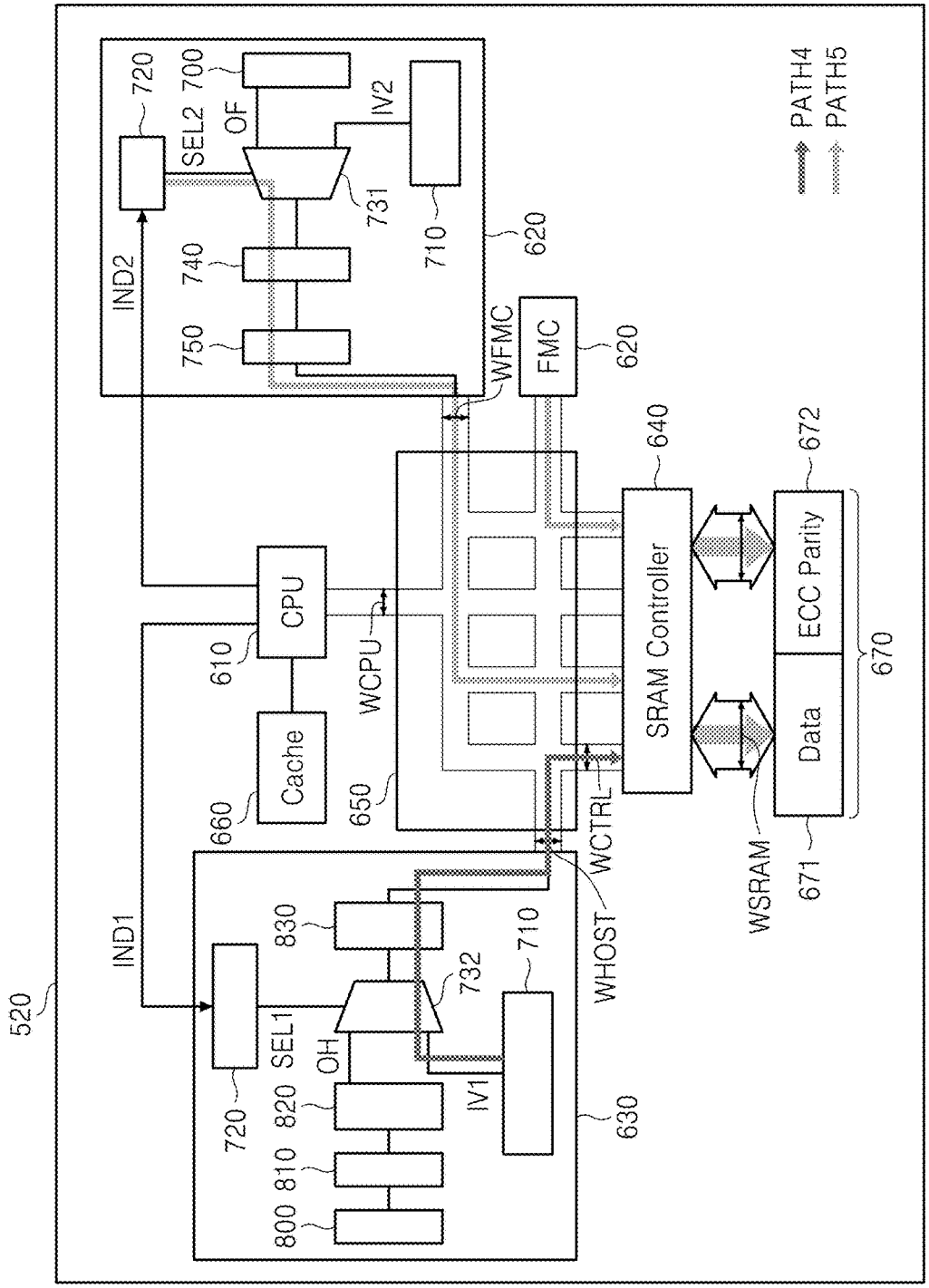
FIG. 14C is a block diagram of the mobile storage controller shown in FIG. 10 when the data region and the parity region included in the SRAM are initialized by the FMC and the host interface, according to an exemplary embodiment.

FIG. 14A is a block diagram of the mobile storage controller 520 shown in FIG. 10 when one SRAM is initialized by an FMC and a host interface, according to an exemplary embodiment, FIG. 14B is a block diagram of the mobile storage controller 520 shown in FIG. 10 when two or more SRAMs are initialized by an FMC and a host interface, according to an exemplary embodiment, and FIG. 14C is a block diagram of the mobile storage controller 520 shown in FIG. 10 when a data region and a parity region included in an SRAM are initialized by an FMC and a host interface, according to an exemplary embodiment.

Referring to FIGS. 14A, 14B, and 14C, the CPU 610 may transmit an indication signal IND2 for indicating an initialization operation to the register 720 included in the FMC 620, and transmit an indication signal IND2 for indicating an initialization operation to the register 720 included in the host interface 630. The indication signals IND1 and IND2 may include the same or different information according to a system design The memory set 710 included in the host interface 630 may output an initialization signal IV1 in response to the indication signal IND1, and the memory set 710 included in the FMC 630 may output an initialization signal IV2 in response to the indication signal IND2.

The initialization signals IV1 and IV2 may include the same or different information according to a system design.

Referring to FIG. 14A, the SRAM controller 640 may receive the initialization signals IV1 and IV2 through the fourth path PATH4 and the fifth path PATH5 in the same manner as described with respect to FIGS. 11A and 12A.

The SRAM controller 640 may transmit the initialization signals IV1 and IV2 transmitted through the fourth path PATH4 and the fifth path PATH5 to the SRAM 670, and the SRAM 670 may be initialized using data included in the initialization signals IV1 and IV2.

Referring to FIG. 14B, the mobile storage controller 520 may include the SRAMs 670-1 and 670-2. Two SRAMs 670-1 and 670-2 are shown in FIG. 14B; however, the number of SRAMs may be changed according to a system design.

A sum of bandwidths WSRAM of buses connecting the SRAM controller 640 and the SRAMs 670-1 and 670-2 may be equal to a sum of bandwidths WCTRL of buses connecting the SRAM controller 640 and the bus matrix 650.

The SRAM controller 640 may receive the initialization signals IV1 and IV2 through the fourth path PATH4 and the fifth path PATH5 in the same manner as described with respect to FIG. 14A. The SRAM controller 640 may simultaneously transmit the initialization signals IV1 and IV2 to the SRAMs 670-1 and 670-2, respectively. The SRAMs 670-1 and 670-2 may be simultaneously initialized using data included in the initialization signals IV1 and IV2.

Referring to FIG. 14C, the SRAM 670 may include a data region 671 and a parity region 672 which may be the same as the data region 671 and the parity region 672 shown in FIG. 11C, respectively, in structure and function.

The SRAM controller 640 may receive the initialization signal IV1 and IV2 through the fourth path PATH4 and the fifth path PATH5 in the same manner as described with respect to FIGS. 14A and 14B. The SRAM controller 640 may transmit the initialization signals IV1 and IV2 to the data region 671 and the parity region 672, respectively. The data region 671 and the parity region 672 may be simultaneously initialized using data included in the initialization signals IV1 and IV2.

Figure 15A:
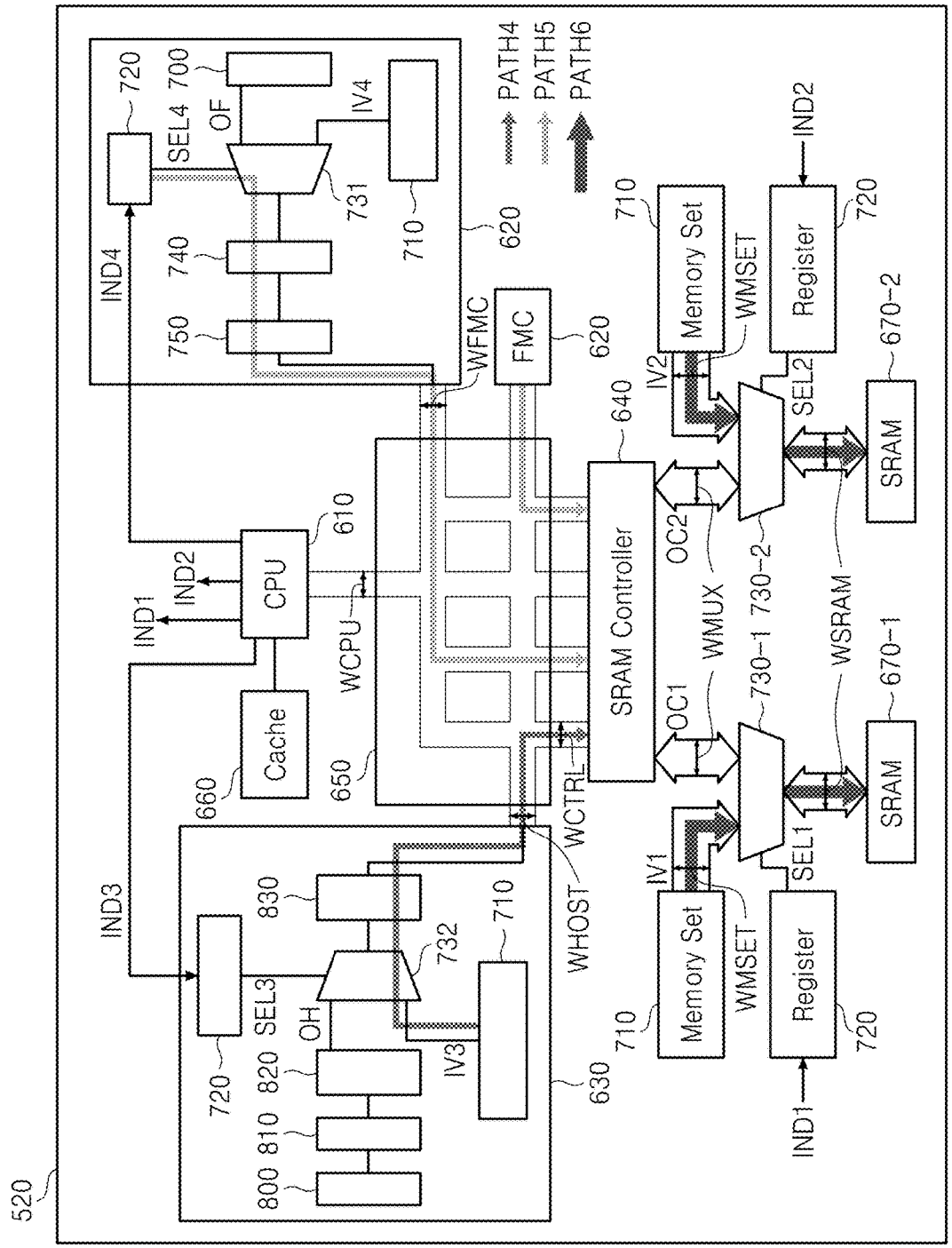
FIG. 15A is a block diagram of the mobile storage controller shown in FIG. 10 when two or more SRAMs are initialized by the flash memory controller, the host interface, and the SRAM controller, according to an exemplary embodiment.

FIG. 15A is a block diagram of the mobile storage controller 520 shown in FIG. 10 when two or more SRAMs are initialized by an FMC, a host interface, and an SRAM controller, according to an exemplary embodiment.

Figure 15B:
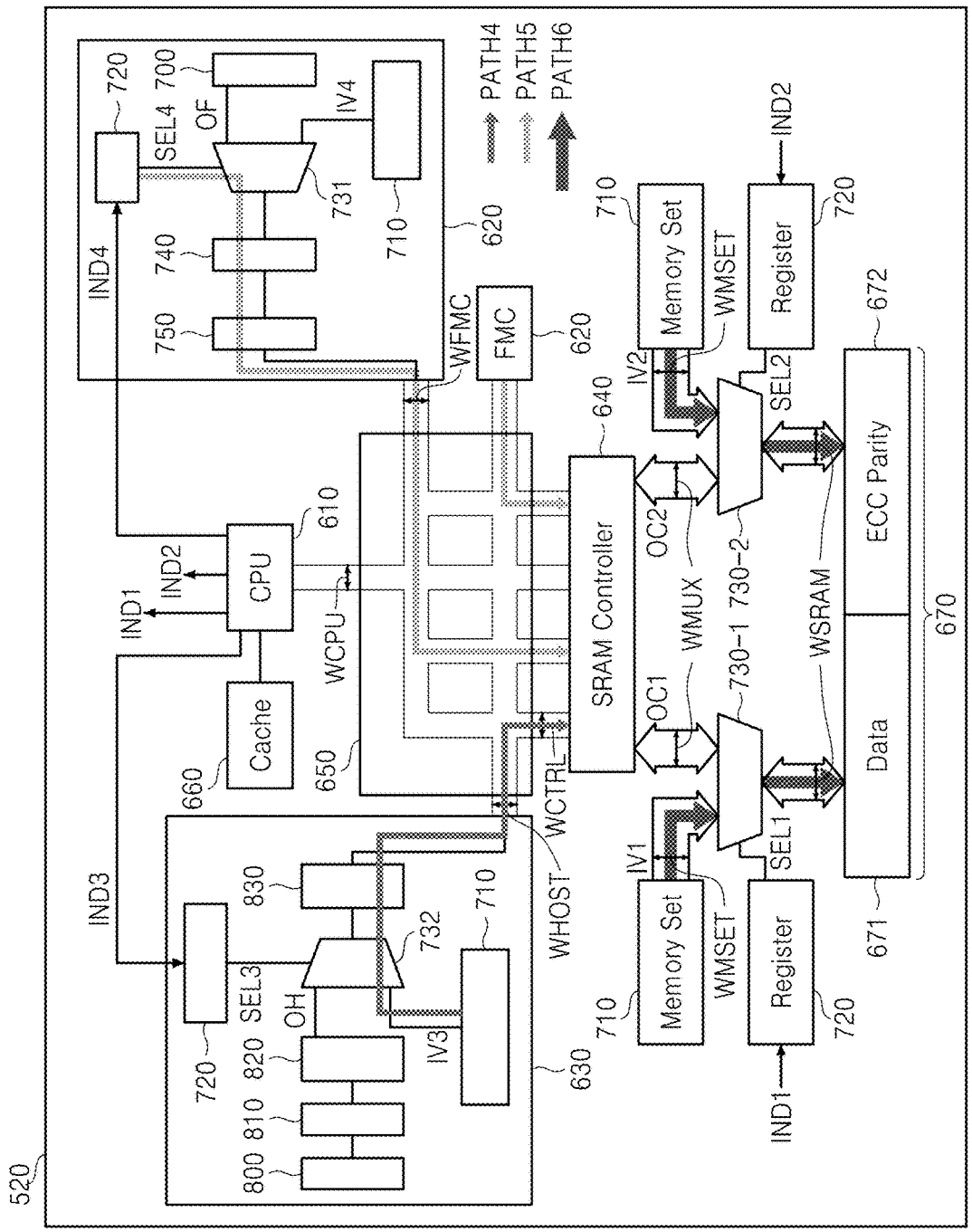
FIG. 15B is a block diagram of the mobile storage controller shown in FIG. 10 when the data region and the parity region included in the SRAM are initialized by the flash memory controller, the host interface, and the SRAM controller, according to an exemplary embodiment.

FIG. 15B is a block diagram of the mobile storage controller 520 shown in FIG. 10 when a data region and a parity region included in an SRAM are initialized by an FMC, a host interface, and an SRAM controller, according to an exemplary embodiment.

Referring to FIGS. 15A and 15B, the CPU 610 may transmit an indication signal IND1 for indicating an initialization operation to the register 720 connected to the multiplexer 730-1, transmit an indication signal IND2 for indicating an initialization operation to the register 720 connected to the multiplexer 730-2, transmit an indication signal IND3 for indicating an initialization operation to the register 720 included in the host interface 630, and transmit an indication signal IND4 for indicating an initialization operation to the register 720 included in the FMC 620.

The indication signals IND1, IND2, IND3, and IND4 may include the same or different information according to a system design.

The two memory sets 710 may output initialization signals IV1 and IV2 in response to the indication signal IND1 and IND2, respectively. The memory set 710 included in the host interface 630 may output an initialization signal IV3 in response to the indication signal IND3, and the memory set 710 included in the FMC 630 may output an initialization signal IV4 in response to the indication signal IND4.

The initialization signal IV1, IV2, IV3, and IV4 may include the same or different information according to a system design.

Referring to FIG. 15A, the mobile storage controller 520 may include the SRAMs 670-1 and 670-2. Only the two SRAMs 670-1 and 670-2 are shown in FIG. 15A; however, the number of SRAMs may be changed according to a system design.

The SRAM controller 640 may receive the initialization signals IV3 and IV4 through the fourth path PATH4 and the fifth path PATH5 in the same manner as described with respect to FIGS. 11A and 12A. One of the SRAMs 670-1 and 670-2 may be initialized using at least one of the initialization signals IV3 and IV4, and simultaneously, the other of the SRAMs 670-1 and 670-2 may be initialized through at least one of the sixth paths PATH6 using at least one of the initialization signals IV1 and IV2.

For example, the SRAM controller 640 may transmit the initialization signals IV3 and IV4 received through the fourth path PATH4 and the fifth path PATH5 to the SRAM 670-1 or 670-2 (for example, 670-1). The SRAM 670-1 or 670-2 (for example, 670-1) which receives the initialization signals IV3 and IV4 may be initialized using the initialization signals IV3 and IV4.

At this time, the CPU 210 may transmit an indication signal IND2 for indicating an initialization operation of the SRAM 670-1 or 670-2 (for example, 670-2) to the register 720 related to the SRAM 670-1 or 670-2 (for example, 670-2) which did not receive at least one of the initialization signals IV3 and IV4 through the SRAM controller 640, and the SRAM 670-1 or 670-2 (for example, 670-2) may be initialized using the initialization signal IV1 or IV2 (for example, IV2) of the memory set 710 at the same time as the SRAM 670-1 or 670-2 (for example, 670-1) is initialized.

Referring to FIG. 15B, the SRAM 670 may include a data region 671 and a parity region 672 which may be the same as the data region 671 and the parity region 672 shown in FIG. 11C, respectively, in structure and function.

The SRAM controller 640 may receive the initialization signals IV3 and IV4 through the fourth path PATH4 and the fifth path PATH5, respectively, in the same manner as described with respect to FIG. 15A. One of the data region 671 and the parity region 672 may be initialized using at least one of the initialization signals IV3 and IV4, and simultaneously, the other of the data region 671 and the parity region 672 may be initialized through at least one of the two sixth paths PATH6 using at least one of the initialization signal IV1 and IV2.

For example, the SRAM controller 640 may transmit the initialization signals IV3 and IV4 received through the fourth path PATH4 and the fifth path PATH5, respectively, to the data region 671. The data region 671 may be initialized using the initialization signals IV3 and IV4.

At this time, the CPU 610 may transmit an indication signal IND2 for indicating an initialization operation of the parity region 672 to the register 720 related to the parity region 672, and the parity region 672 may be initialized using the initialization signal IV1 or IV2 (for example, IV2) of the memory set 710 at the same time as the data region 671 is initialized.

A method of operating a storage controller according to the foregoing exemplary embodiments can initialize a memory included in a storage using a device with a wide bandwidth, thereby reducing time for initialization of the memory.

Although a few exemplary embodiments of the inventive concept have been shown and described, it will be appreciated by those skilled in the art that changes may be made in these embodiments without departing from the principles and spirit of the inventive concept, the scope of which is defined in the appended claims and their equivalents.

What is claimed is:

1. A method of operating a storage controller which is included in a data storage device and initializes at least one dynamic random access memory (DRAM) of the data storage device, the method comprising:
   transmitting, by a processor of the storage controller, a first indication signal for indicating initialization of the DRAM of the data storage device to a first memory initialization device which is one of a flash memory controller for controlling a NAND flash memory, a host interface for communicating with a host, and a memory controller for controlling the DRAM;
   generating, by a register of the first memory initialization device, a first selection signal corresponding to the first indication signal, and
   outputting, by a memory set of the first memory initialization device, a first initialization signal comprising a first initialization value stored in the memory set to the DRAM in response to the first selection signal to initialize the DRAM based on the first initialization signal,
   wherein the storage controller comprises a bus matrix comprising a plurality of buses through which the processor, the first memory initialization device, and the DRAM communicate with one another, and
   wherein the processor communicates with die bus matrix through a first bus having a first bandwidth, and the first memory initialization device communicates with the bus matrix through a second bus having a second bandwidth, greater than the first bandwidth, to initialize the DRAM.

2. The method of claim 1, further comprising:
   transmitting, by the processor, a normal indication signal for indicating a normal operation of the first memory initialization device to the first memory initialization device;
   outputting, by the register, a normal selection signal corresponding to the normal indication signal for indicating the normal operation; and
   performing, by the first memory initialization device, the normal operation in response to the normal selection signal corresponding to the normal indication signal for indicating the normal operation,
   wherein the register includes information related to the initialization of the DRAM, and information related to the normal operation.

3. The method of claim 1, wherein the DRAM comprises a data region storing data and a parity region storing error detection data for detecting an error of the data stored in the data region, and
   wherein the data region and the parity region are simultaneously initialized by the first initialization signal.

4. The method of claim 1, wherein the DRAM comprises a plurality of memories, and
wherein the plurality of memories are simultaneously initialized by the first initialization signal.

5. The method of claim 1, wherein the data storage device is a solid state drive (SSD) comprising the NAND flash memory, and the storage controller is an SSD controller.

6. A method of operating a storage controller which is included in a data storage device and initializes at least one main memory of the data storage device, the method comprising:
transmitting, by a processor of the storage controller, a first indication signal for indicating initialization of the main memory of the data storage device to a first memory initialization device;
generating, by a register of the first memory initialization device, a selection signal corresponding to the first indication signal;
outputting, by a memory set of the first memory initialization device, a first initialization signal to the main memory in response to the selection signal to initialize the main memory;
transmitting, by the processor of the storage controller, a second indication signal for indicating the initialization of the main memory of the data storage device to a second memory initialization device;
generating, by a register of the second memory initialization device, a second selection signal corresponding to the second indication signal; and
outputting, by a memory set of the second memory initialization device, a second initialization signal to the main memory in response to the second selection signal corresponding to the second indication signal to initialize the main memory,
wherein the first and second initialization signals simultaneously initialize the main memory.

7. The method of claim 6, wherein the first memory initialization device is one of a flash memory controller for controlling at least one of a plurality of NAND flash memories and a host interface for communicating with a host, and
wherein the second memory initialization device is another of the flash memory controller and the host interface,
wherein the storage controller comprises a bus matrix comprising a plurality of buses through which the processor, the first memory initialization device, the second memory initialization device, and the main memory communicate with one another, and
wherein the processor communicates with the bus matrix through a first bus having a first bandwidth, the first memory initialization device communicates with the bus matrix through a second bus having a second bandwidth to initialize the main memory, the second memory initialization device communicates with the bus matrix through a third bus having a third bandwidth to initialize the main memory, and each of the second bandwidth and the third bandwidth is greater than the first bandwidth.

8. The method of claim 6, further comprising:
transmitting, by the processor of the storage controller, a third indication signal for indicating the initialization of the main memory of the data storage device to a third memory initialization device;
generating, by a register of the third memory initialization device, a third selection signal corresponding to the third indication signal, and
outputting, by a memory set of the third memory initialization device, a third initialization signal to the main memory in response to the third selection signal corresponding to the third indication signal to initialize the main memory,
wherein the first, second and third initialization signals simultaneously initialize the main memory.

9. The method of claim 8, wherein the first, second and third memory initialization devices are, respectively, a flash memory controller for controlling at least one of a plurality of NAND flash memories, a memory controller for controlling the main memory, and a host interface for communicating with a host.

10. The method of claim 6, wherein the first memory initialization device is one of a flash memory controller for controlling at least one of a plurality of NAND flash memories, a memory controller for controlling the main memory, and a host interface for communicating with a host, and a memory controller for controlling the main memory,
wherein the second memory initialization device is another of the flash memory controller, the host interface, and the memory controller, and
wherein the first and second initialization signals comprise first and second initialization values, respectively.

11. A controller of a data storage device, the controller comprising:
a processor configured to generate a first indication signal for indicating initialization of a DRAM of the data storage device;
a first memory initialization device comprising a register and a memory set and configured to receive the first indication signal; and
a bus matrix comprising a plurality of buses through which the processor, the first memory initialization device, and the DRAM communicate with one another,
wherein the first memory initialization device is one of a flash memory controller for controlling a NAND flash memory, a memory controller for controlling the DRAM, and a host interface for communicating with a host,
wherein the register is configured to generate a first selection signal corresponding to the first indication signal, and the memory set is configured to output a first initialization signal comprising a first initialization value stored in the memory set to the DRAM in response to the first selection signal to initialize the DRAM based on the first initialization signal, and
wherein the processor communicates with the bus matrix through a first bus having a first bandwidth, and the first memory initialization device communicates with the bus matrix through a second bus having a second bandwidth, greater than the first bandwidth, to initialize the DRAM.

12. The controller of claim 11,
wherein the DRAM comprises a plurality of memories, which are simultaneously initialized by the first initialization signal.

13. The controller of claim 11,
wherein the DRAM comprises a data region storing data and a parity region storing error detection data for detecting an error of the data stored in the data region, which are simultaneously initialized by the first initialization signal.

14. The controller of claim 11, wherein the processor is further configured to generate a second indication signal for indicating the initialization of the DRAM of the data storage device, wherein the controller further comprises a second memory initialization device comprising a register and a memory set and configured to receive the second indication signal from the processor, wherein the second memory initialization device is another of the flash memory controller, the memory controller, and the host interface, wherein the register of the second memory initialization device is configured to generate a selection signal corresponding to the second indication signal, and the memory set of the second memory initialization device is configured to output a second initialization signal comprising a second initialization value stored in the memory set of the second memory initialization device to the DRAM in response to the second selection signal corresponding to the second indication signal to initialize the DRAM based on the second initialization signal, and wherein the first and second initialization signals simultaneously initialize the DRAM.

15. The controller of claim 14, wherein the processor is further configured to generate a third indication signal for indicating the initialization of the DRAM of the data storage device, wherein the controller further comprises a third memory initialization device comprising a register and a memory set and configured to receive the third indication signal from the processor, wherein the third memory initialization device is one of the flash memory controller, the memory controller, and the host interface, different from the first and second memory initialization devices, wherein the register of the third memory initialization device is configured to generate a third selection signal corresponding to the third indication signal, and the memory set of the third memory initialization device is configured to output a third initialization signal comprising a third initialization value stored in the memory set of the third memory initialization device to the DRAM in response to the third selection signal corresponding to the third indication signal to initialize the DRAM based on the third initialization signal, and wherein the first, second and third initialization signals simultaneously initialize the DRAM.

16. The controller of claim 11, wherein the NAND flash memories include a three-dimensional memory array.

17. The controller of claim 11, wherein the data storage device is a solid state drive (SSD) comprising the NAND flash memory, and the controller is an SSD controller.

* * * * *